(12) United States Patent
Isaacs et al.

(10) Patent No.: US 9,690,831 B2
(45) Date of Patent: Jun. 27, 2017

(54) COMPUTER-IMPLEMENTED SYSTEM AND METHOD FOR VISUAL SEARCH CONSTRUCTION, DOCUMENT TRIAGE, AND COVERAGE TRACKING

(71) Applicant: Palo Alto Research Center Incorporated, Palo Alto, CA (US)

(72) Inventors: Ellen Isaacs, San Jose, CA (US); Mudita Singhal, Sunnyvale, CA (US); Ignacio Solis, South San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 267 days.

(21) Appl. No.: 13/866,912

(22) Filed: Apr. 19, 2013

(65) Prior Publication Data

US 2014/0317104 A1    Oct. 23, 2014

(51) Int. Cl.
G06F 17/30    (2006.01)

(52) U.S. Cl.
CPC .. G06F 17/30554 (2013.01); G06F 17/30637 (2013.01)

(58) Field of Classification Search
CPC ............... G06F 17/30696; G06F 17/30864
See application file for complete search history.

(56) References Cited

U.S. PATENT DOCUMENTS

| | | | |
|---|---|---|---|
| 8,280,783 B1 * | 10/2012 | Brownell | G06Q 30/00 705/26.1 |
| 2001/0049684 A1 * | 12/2001 | Light et al. | 707/102 |
| 2002/0023077 A1 * | 2/2002 | Nguyen et al. | 707/1 |
| 2003/0225755 A1 * | 12/2003 | Iwayama et al. | 707/3 |
| 2007/0239702 A1 * | 10/2007 | Vassilvitskii et al. | 707/5 |
| 2008/0263022 A1 * | 10/2008 | Kostorizos et al. | 707/5 |
| 2012/0124036 A1 * | 5/2012 | Ramos | G06F 17/30274 707/723 |
| 2012/0233160 A1 * | 9/2012 | Koomullil et al. | 707/728 |
| 2012/0278321 A1 * | 11/2012 | Traub et al. | 707/736 |
| 2014/0058840 A1 * | 2/2014 | Chakrabarty et al. | 705/14.55 |

OTHER PUBLICATIONS

IN-SPIRE., "IN-SPIRE Visual Document Analysis." Retrieved from the Internet: URL:http://in-spire.pnnl.gov/, [cached on Feb. 14, 2013].

* cited by examiner

*Primary Examiner* — Carol Choi
(74) *Attorney, Agent, or Firm* — Patrick J. S. Inouye; Krista A. Wittman

(57) ABSTRACT

A computer-implemented system and method for visual search construction, document triage, and coverage tracking is provided. One or more search topics are received from a user. The search topics are positioned along a graph to generate a query. A search for resulting topics that are related to one or more of the search topics is conducted using the query. The topic results are displayed in the graph in relation to the placed search topics of the query.

18 Claims, 17 Drawing Sheets

FIG. 4

COMPUTER-IMPLEMENTED SYSTEM AND METHOD FOR VISUAL SEARCH CONSTRUCTION, DOCUMENT TRIAGE, AND COVERAGE TRACKING

This invention was made with government support under Contract No. 2011-11090700005 CSS ProVisTasks 6. The government has certain rights in the invention.

FIELD

This application relates in general to conducting document searches and, in particular, to a computer-implemented system and method for visual search construction, document triage, and coverage tracking.

BACKGROUND

Document searches are frequently conducted to find answers to questions that arise, or to conduct research regarding an issue or topic. Due to the large number of electronic documents available, document searches can be complex, time consuming, and frustrating. Additionally, many searches may not be effective in accessing the desired results.

Currently, users can conduct document searches via known search engines, such as Yahoo! Search, owned by Yahoo! Inc. of Sunnyvale, Calif., or Google Search, owned by Google, Inc. of Mountain View, Calif. Conventional document searches rely on a user's knowledge of the desired results to construct a query appropriate for accessing the most relevant information. The Yahoo! and Google search engines each present results as a list of documents that are ordered by relevance in descending order. Depending on the number of search results returned, the results are provided on multiple pages that a user must review. Additionally, to access documents, a user clicks on document links, choosing whether to open them in a separate tab from the search results or the same tab. A user must then separately review the documents, either by switching among tabs or going back and forth among documents and the search results in the same tab. Accordingly, the user-interface (UI) of the current search engines fail to provide the user with an overview of a search space and guide her to choose the relevant query terms. In addition, current search UIs do not provide ability to track the browsing process, which makes it difficult to estimate when they have researched a topic enough to know when they have achieved a sufficiently complete understanding of the topic.

Therefore, there is a need for a more effective way to visualize the search results to allow the user to obtain an overview of the search space, identify key topics and formulate concepts, and track progress of reviewing the results. Preferably, the search query is generated visuospatially and the results are provided via a visuospatial layout with which the user can interact to review the material and refine the search.

SUMMARY

Conducting research regarding a particular topic can be time consuming and possibly unsuccessful. Often times, the search depends on a user's knowledge of the subject matter to generate a query to research a particular topic. However, the user may not possess enough knowledge to construct the most effective search query to identify the desired results. Additionally, when the volume of the search results is large, important information is often missed because the user is unable to determine what proportion of the relevant material she has reviewed with respect to a topic. A visuospatial search focuses on visually constructing queries using topics that are presented to the user, rather than relying on entering keywords and displaying a list of results. The search results visualization allows a user to see an overview of a search space, determine what information is necessary to review, and get feedback on the user's coverage, thus revealing gaps and biases in the user's coverage, all in an effort to know when the user has attained an acceptable level of understanding when researching a particular issue or matter.

An embodiment provides a computer-implemented system and method for visual search construction, document triage, and coverage tracking. One or more search topics are received from a user. The search topics are positioned along a graph to generate a query. A search for resulting topics that are related to one or more of the search topics is conducted using the query. The topic results are displayed in the graph in relation to the placed search topics of the query.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screenshot showing, by way of example, a visual interface for displaying result topics in a list.

DETAILED DESCRIPTION

Conducting a search for documents can be time-consuming and frustrating due to the large number of available documents presented as search results. The current search engines require users to know what they are searching for and provide limited assistance in phrasing the query appropriately. A visuospatial search system allows the user to determine particular information to look for, avoid missing key information and know when to stop searching by (1) visualizing a search space based on topics extracted from documents relevant to the search, (2) visually generating a search query based on those topics, (3) comparing search results for two or more different topics or concepts, (4) triaging and filtering search results and (5) tracking coverage of search results along attributes such as date of publication and source.

Figure 1:
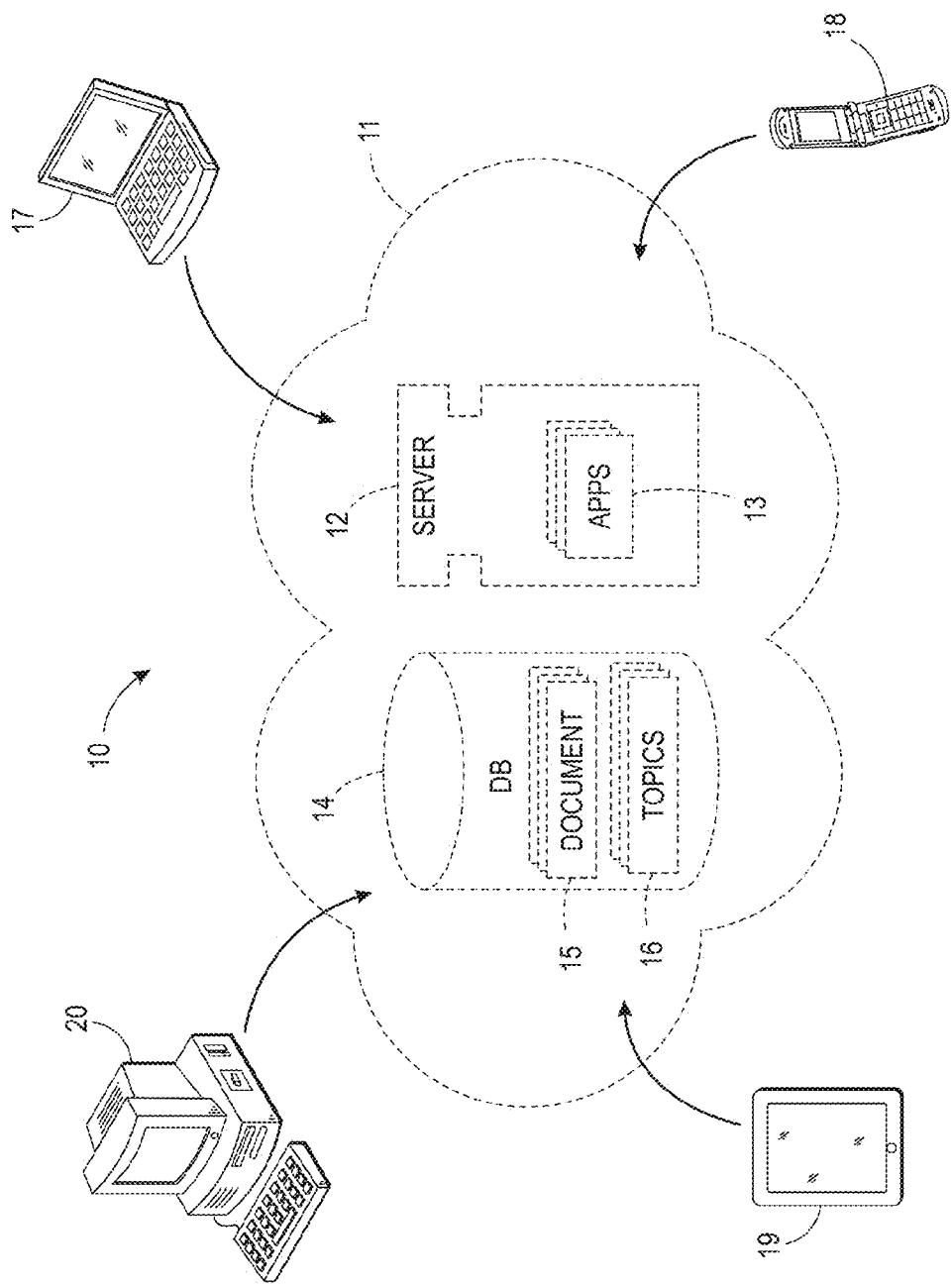
FIG. 1 is a block diagram showing a computer-implemented system for visual search construction, document triage, and coverage tracking, in accordance with one embodiment.

The visuospatial search can be initiated by compiling search topics identified by a user via a visual display. FIG. 1 is a block diagram showing a computer-implemented system 10 for visual search construction, document triage, and coverage tracking, in accordance with one embodiment. The system can operate via a cloud computing environment, which allows end users to access and utilize remotely-stored applications 49 without requiring the users to install software or personal data. Instead, clients receive cloud-based software 13 and stored data. Each of the end users operate computing devices 17-20, including a desktop computer 20, laptop 17, tablet 19, or cellular telephone 18, as well as other types of computing devices, to access the applications 13 and data 15, 16 stored on remote servers 12 and databases 14, respectively, via a network 11. At a minimum, each computing device should include accessibility to an internetwork and have the ability to execute an application.

The user device 12-14 and servers 15, 21 include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to user devices, are possible.

Once accessed, the application 13 allows the user to visually construct a search query, visualize the results, filter the results, and track the user's progress through the results. In one example, the search query is applied to a set of documents 15. The documents most relevant to the query are selected and clustered to determine relevant topics for the query. Specifically, the topics can be determined using a topic-modeling algorithm. Subsequently, the topics are returned to the user as results of the query search. In a further embodiment, the query is directly applied to predetermined topics 16 that are also stored in the database 14. The document database 14 can also include indices (not shown) of topics and documents to identify the documents associated with each topic and the topics associated with each document. Relevance of the search query to the documents and topics can be based on, for example, a cosine similarity, as well as other similarity measures.

Topics most relevant to the search terms can be presented to the user via a topics graph (not shown) where the topics are represented by nodes and are connected by an edge if the topics are mentioned together in a large percentage of documents. The percentage can be defined by the user or as a default. Additionally, documents in the search result are simultaneously presented in list form, rank ordered by their relevance score or by other attributes, such as date or source. A display generator can be located on the server or client to arrange and present the topic results to the user, such that the results are placed in the display in accordance with their relevance to the displayed query. Meanwhile, concepts of topics can be generated and two or more of the concepts can be generated. Additionally, instructions or methods for filtering the results can be located on the server or client for assisting the user in refining a search query and narrowing the search results by applying a filter selected by the user and applying the changes across all visualizations of the results.

The user devices 17-20 and servers 12 can include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Overview of Visuospatial Search Space

Figure 2:
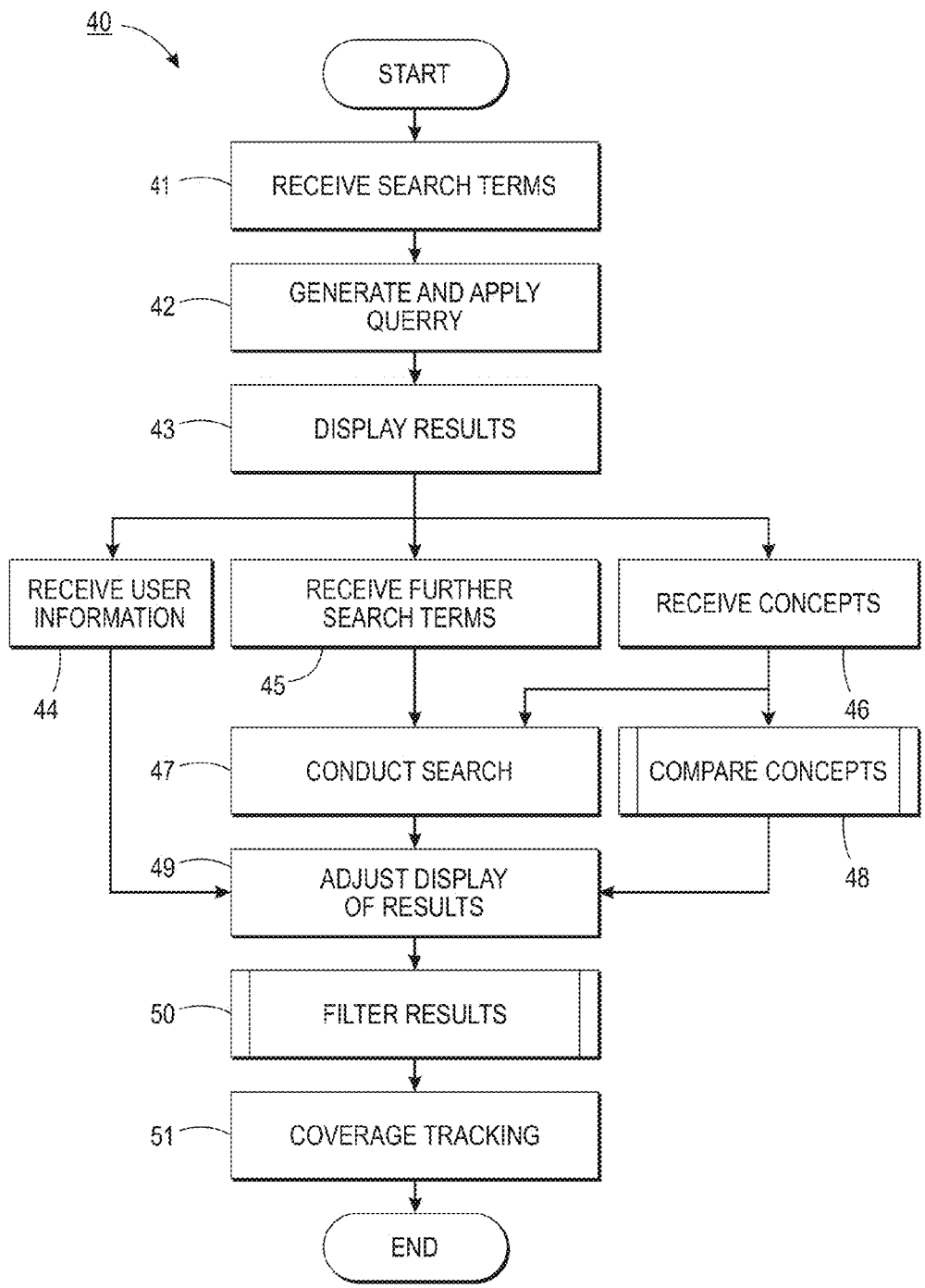
FIG. 2 is a flow diagram showing a method for visual search construction, document triage, and coverage tracking, in accordance with one embodiment.

Constructing a visuospatial search allows a user to interact with the results for researching a topic area or locating answers to questions. FIG. 2 is a flow diagram showing a method for visual search construction, document triage, and coverage tracking, in accordance with one embodiment. A user enters one or more search terms into a search field (block 41), which can be located across a top of a search page. The search terms can include keywords, topics, and concepts; however, other search terms are possible, such as whole documents, images, or videos. A topic represents a theme of one or more documents, while a concept covers two or more related topics. The user enters one or more topics and concepts into a search field to generate a search query, which is applied (block 42) to a set of document topics, for example. The topics can be stored in a database and determined by using an algorithmic approach, such as Topic Modeling that clusters words in a document to extract and assign topics to each document.

The search query yields a list of documents relevant to the query. Each document is associated with one or more topics and an ordered list of topics can be created for the search query based on the relevant documents. The topics can each be displayed (block 43) via a topic graph. The node in the graph would be a topic and can be represented by a topic box, which has the shape of a square, rectangle, circle, or other shape. The relevant topics can be displayed based on their relevance score to the search query and their degree of interrelatedness with one another. Specifically, in a magnet model those topic results that are most relevant to the query can be displayed towards the top of the topic graph close to the query, while the results that are less relevant are displayed in decreasing order, further away from the topic graph. Additionally, the related topic results are displayed closer to each other than unrelated topic results. Displaying the results is further discussed below with reference to FIG. 3.

Once displayed, the user can perform multiple functions on the results to refine the search and identify important documents for review. The user can select one of the result topics (block 44) to identify related topics. Upon selection of the result topic, the topic graph can be adjusted (block 49) to identify those result topics that are related to the selected result topic. The related result topics can be identified by highlighting the associated text boxes, color coding the relevant topic boxes a different color than the remaining topic boxes, or changing the shape of the topic boxes, as well as other identification schemas, such as changing the font of the topic boxes or adjusting the location of the topic boxes. Selecting topics are further discussed below with reference to FIG. 13.

Additionally, the user can enter (block 45) further search topics or remove search topics to refine a search. In one example, the user can select at least one of the displayed result topics and drag the selected topic into the search field using a pointer device, including a mouse, stylus, or finger, such as on a touch screen, as well as other types of pointer devices. The search query is updated to include the additional topics, or remove selected topics, and a further search for topics is conducted (block 47). The topic graph is then updated (block 49) to display the results of the revised query.

The search query can also be updated by adding (block 46) or removing concepts selected by the user. A concept can include two or more topics or search terms and is generated by entering the topics or search terms into the search field. Alternatively, the concepts can be generated by another user or automatically by the visual search system. Each concept of topics can be assigned an identifier that covers the topics. For instance, the concept for "patents" can include the topics "prosecution," "litigation," and "licensing." The query is updated to include the topics of the concept and a further search is conducted (block 47). The topic graph is adjusted (block 49) to display the results of the revised query. The concepts received from the user can be compared (block 48) to identify result topics related to both concepts, as further discussed below with reference to FIGS. 7 and 8.

The results display is adjusted (block 49) based on a user-selected topic (block 44), revised query with new search topics (block 45), revised query with concepts (block 46), and concept comparisons (block 48). During review of the adjusted results, the user can perform one or more of the search functions described above, including selecting topic results, updating a query, and comparing concepts in combination or as necessary. Additionally, the user can filter (block 50) the search results based on the revised or updated queries. The results can be filtered based on an entity type, including for example, person, place, or organization, as well as by source, author, status, or date. Other filters are possible. Filtering topic results is further discussed below with reference to FIGS. 14 and 15. During review, the user can also track (block 51) her coverage of the results by identifying her progress with reviewing the documents, determining any biases by the user, and identifying patterns of review. Coverage tracking of the results is further discussed below with reference to FIG. 16.

Topic Search View

Figure 3:
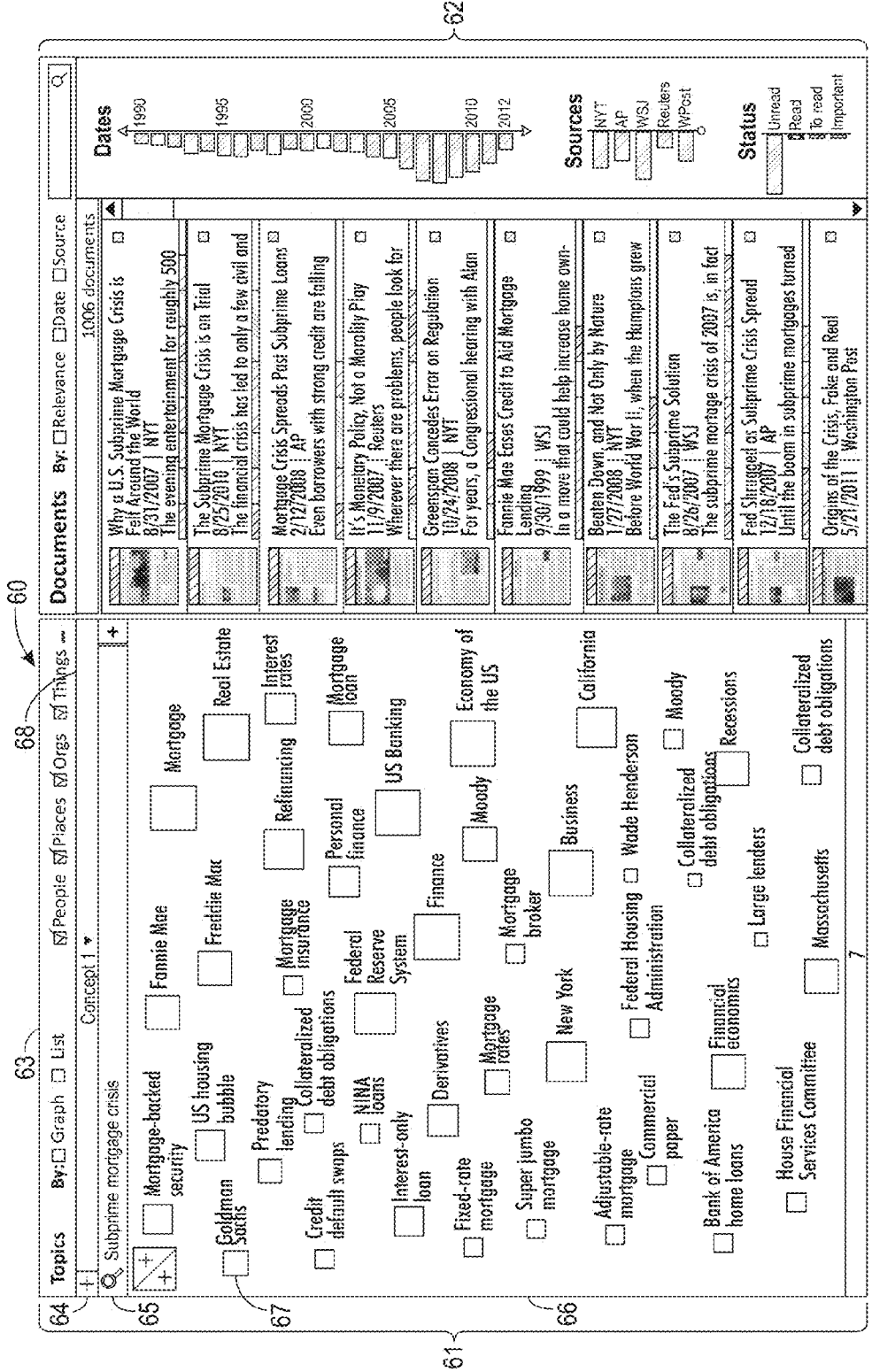
FIG. 3 is a screenshot showing, by way of example, a visual interface for a visuospatial search space.

A search query can be generated and the results can be provided via a visuospatial layout with which the user can interact. FIG. 3 is a screenshot showing, by way of example, a visual interface 60 for a visuospatial search space. The interface 60 can be provided via a Web page, native application or any other user interface display mechanism, and can include a topic search view 61 and a document section 62. In one embodiment, the topic search view 61 can be located on a left side of the interface 60 and can include topic factors 63, a concept field 64, search field 65, and topic graph 66. The topic factors 63 specify the types of displays for the results and the types of result topics to be displayed, which can function as topic filters. Specifically, the result topics can each be associated with an entity designation, including person, place, organization, or thing, as well as other types of entity designations. A user can filter the result topics by selecting one or more of the entity types for displaying only those result topics that are associated with the selected entity types, as further described below with reference to FIGS. 14 and 15. Additionally, the user can select a display type for the topic results, including a graph display or a list display, as further described below with reference to FIG. 4. Other types of displays are also possible.

The concept field 64 can include a concept identifier, while the search field 65 can include one or more topics. In one embodiment, the search field 65 can be located in a top portion of the topic search view 61. However, more than one search field 65 can be displayed, and other locations for the search fields 65 are possible. The search field 65 can also be expanded to include additional topics. To expand the search field 65, the user can select an expand button 68 having, for example, an addition sign, for adding the additional topics. The user can also combine multiple topics to create a concept, which the user can label. The user can create multiple concepts, each made up of one or more topics, and they can load them into the search field 65 through a menu, which can be indicated by an arrow, as further described below with reference to FIG. 6.

The topic graph 66 provides a visual display of the topics identified as results of the query. The topics presented may have different levels of specificity. Some topics may be general concepts such as "politics" or "finance" and others may be very specific, such as "credit default swaps" or "adjustable rate mortgages." The display of the result topics within the topics graph 66 can represent a portion of the result topics that are most relevant to the search topics. A thick bar 69 along the bottom of the topics graph 66 can represent the remainder of the search space that is not as relevant to the current search query. The user can move around the search space using a pointer device, such as by hovering over, clicking on, or tapping the bar with the pointer device.

A topic box 67 can represent each result topic in the graph, and a size of the topic boxes can be dependent upon the number of documents associated with that topic. For instance, the more documents associated with a result topic, the larger the size of the topic box. The size of the topic box can also represent other attributes of the associated document, such as source. As well, the number of documents can also be represented by color, shape, font, or other characteristic, rather than by the size of the topic box.

The results are displayed according to relevance to the terms of the search query, such as by placing those results that are most relevant closest to the query, near the top of the topic graph 66, while those results that are less relevant are located further down the topic graph 66, away from the search query. In one embodiment, each result topic displayed along a common horizontal plane has the same relevance. Additionally, those topic results that are highly related are placed near one another in the graph, while the less related topics are located further apart.

Each topic box can be associated with a topic menu, which allows a user to select an action to be performed upon the topic represented by the box. The menu can include actions, such as "add topic to concept," "remove topic from graph," and "rename topic." The user can access the menu by right clicking on a mouse that is positioned over the topic box or by hovering a pointer device over the topic box or by pressing and holding a pointing device on the topic box. The pointing device can include a mouse, stylus, finger of the user, as well as other devices. Other means for accessing the menu are possible such as gestures and mouse movements indicating dragging the topic to the search area to indicate "add topic to concept" or dragging it outside the view space of the topics graph to indicate "remove/delete topic." Removing a topic from the topics graph may be used to refine the search query, such that other topics closely related to the removed topic are considered less relevant, resulting in an adjustment of the layout of the remaining topic boxes.

Figure 4:
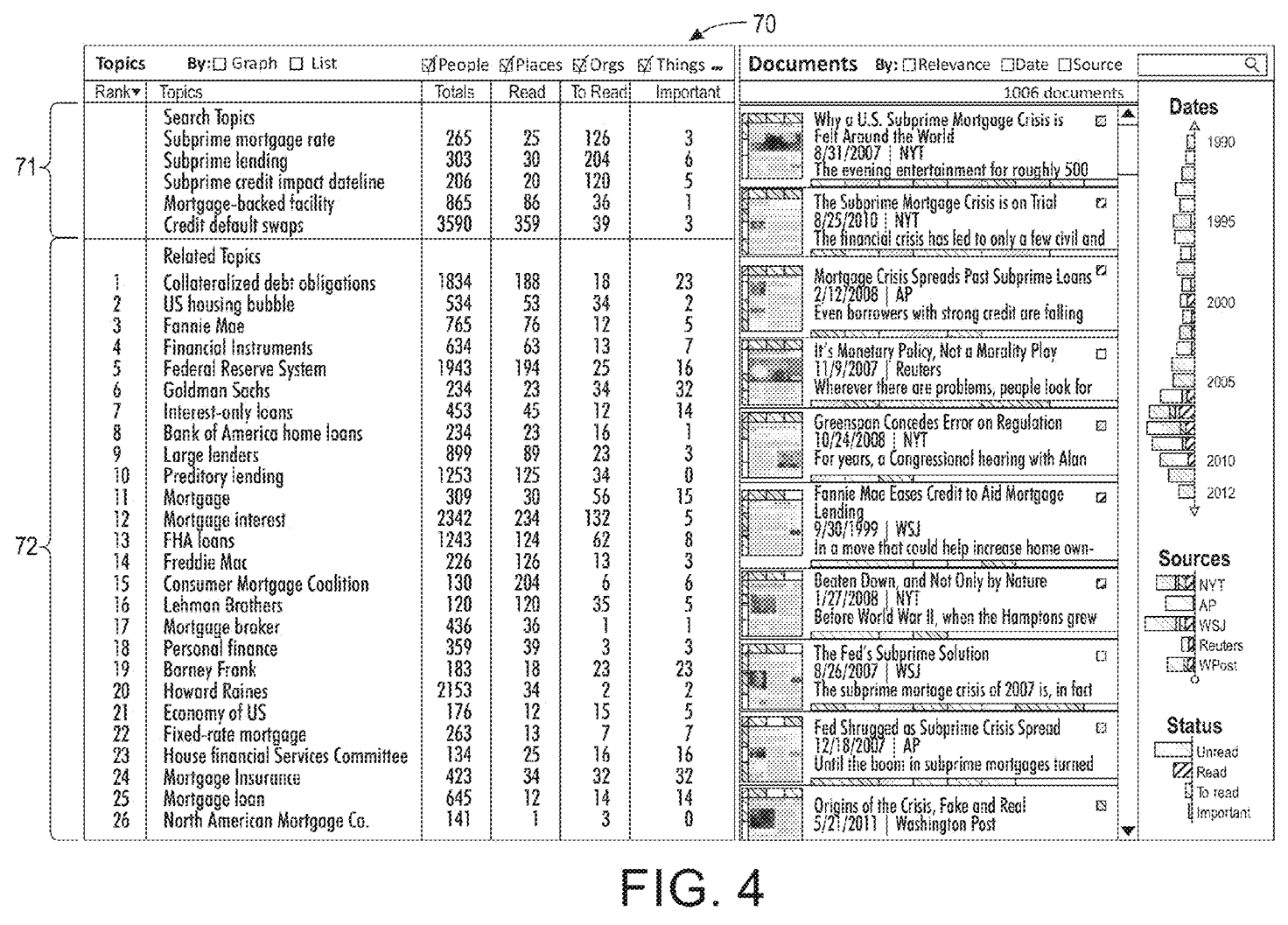

In a further embodiment, the results of the display graph can be displayed as a list. FIG. 4 is a screenshot showing, by way of example, a search interface 70 for displaying result topics as a list. The search topics can be entered in a list form 181 at a top of the topic section. Results of the search are displayed below the search topics in list form. In one embodiment, the result topics are ranked by relevance in descending order. However, other displays of the result topics in the list are possible, such as a by relevance in ascending order or alphabetically ordered.

Visual Query Construction

Figure 5:
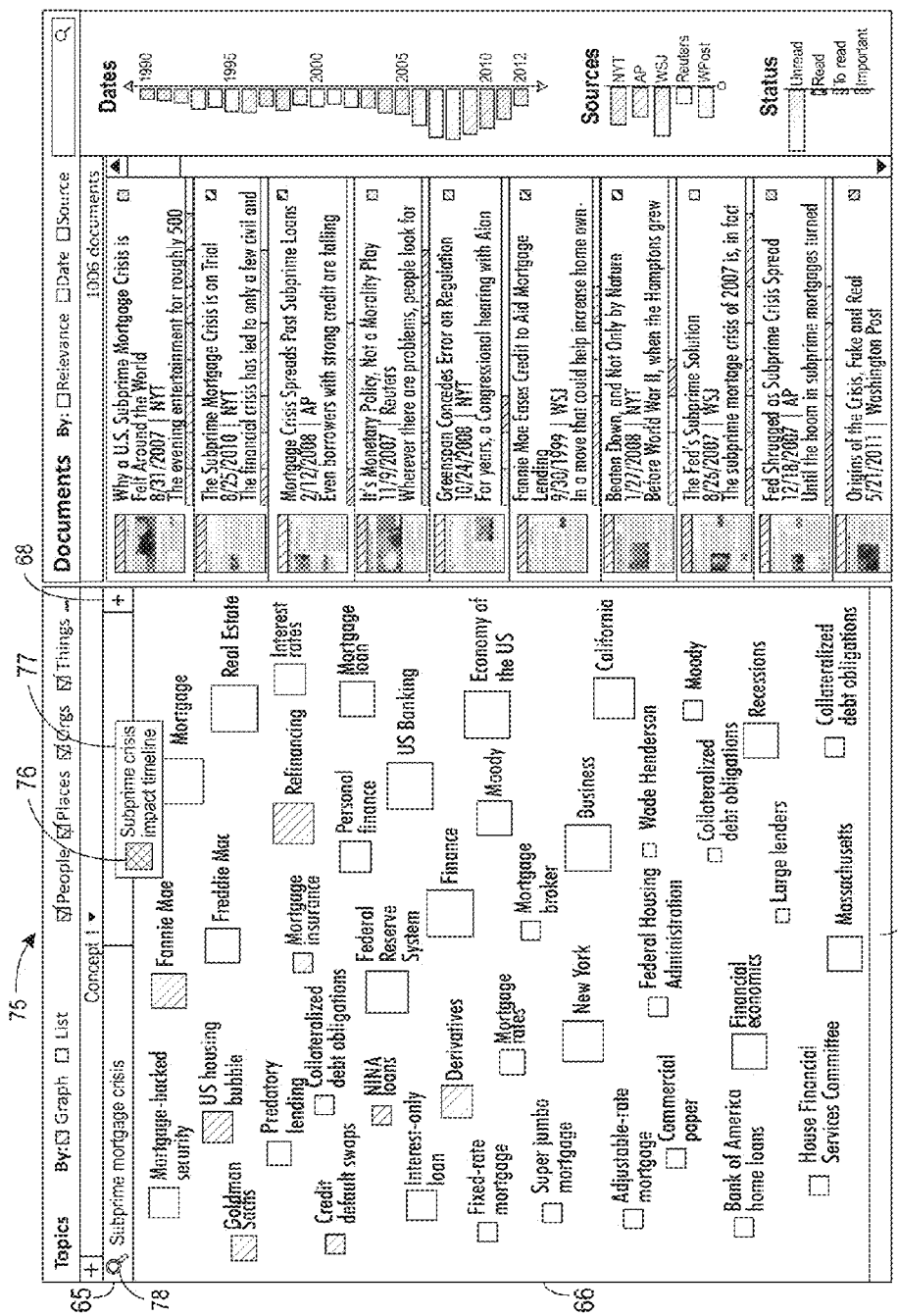
FIG. 5 is a screenshot showing, by way of example, a visual interface for generating a search query.

The user can generate a search by adding or removing topics into the search field. FIG. 5 is a screenshot showing, by way of example, a visuospatial search interface 75 for generating a search query. The user can select an expand tool 68, such as an addition sign in the search field 65, to add slots for further search topics. Specifically, selection of the expand tool generates an additional topic space 77 within the search field in which a further search topic 76 can be entered. The user can manually enter the search topic 76 or can select one of the result topics in the topic graph 66 as the search topic 76. After selecting a result topic, the user can drag the topic box 67 of the desired topic into the empty space of the search field 65 using, for example, a pointer device. After the result topic is included in the search field 65, a search can be automatically conducted or the user can initiate the search by selecting a search icon 78, such as a magnifying glass. The search can be based on a union or intersection of search topics as further described below with reference to FIG. 6, or based on a combination of the search topics that are automatically determined using an algorithm. Specifically, the results can be determined via an algorithm that considers the topics, keywords, topic frequencies and global topic relationships. A display of the results can be adjusted based on the user's interaction with the topics and documents.

The result topics in the topic graph 66 are updated with some of the result topics moving up in the display graph 66 based on a higher relevance to the revised query, while other result topics move down the graph 66. Additionally, result topics can be added to the display graph 66 or removed from the previous results. Specifically, new topics may emerge from the bottom of the graph and other topics may recede into it. The bar 69 along the bottom of the topics graph 66 represents the remainder of the search space that is not as relevant to the current search query. The user can view additional topics that are just beyond the relevance threshold by expanding that bar in some way using the pointer device, as described above. The result topics revealed can be ordered by relevance in the same way as those within the topics graph.

The user can refine a search by adding or removing search topics to identify more specific result topics relevant to a need of the user. For example, when a user refines a search by entering multiple topics, the proportion of general topics displayed may become lower and the proportion of specific topics may become higher.

As described above with reference to FIG. 3, the most relevant documents are located near a top of the topic graph 66 and the less relevant documents are located closer to a bottom of the topic graph 6. In one embodiment, each document along a common horizontal plane has the same relevance, regardless of whether the topic is located under a particular search term in the query. However, in a further embodiment, relationships between the result topics and each individual search term can also be considered, such that a placement of a result topic along a horizontal plane of the topic graph can be based on a relevance to each of the search terms. For example, the topic "Fannie Mae" is more related to the search term "subprime mortgage crisis," while the topic "mortgage" is more related to the search term "subprime crisis impact timeline."

Concepts

Figure 6:
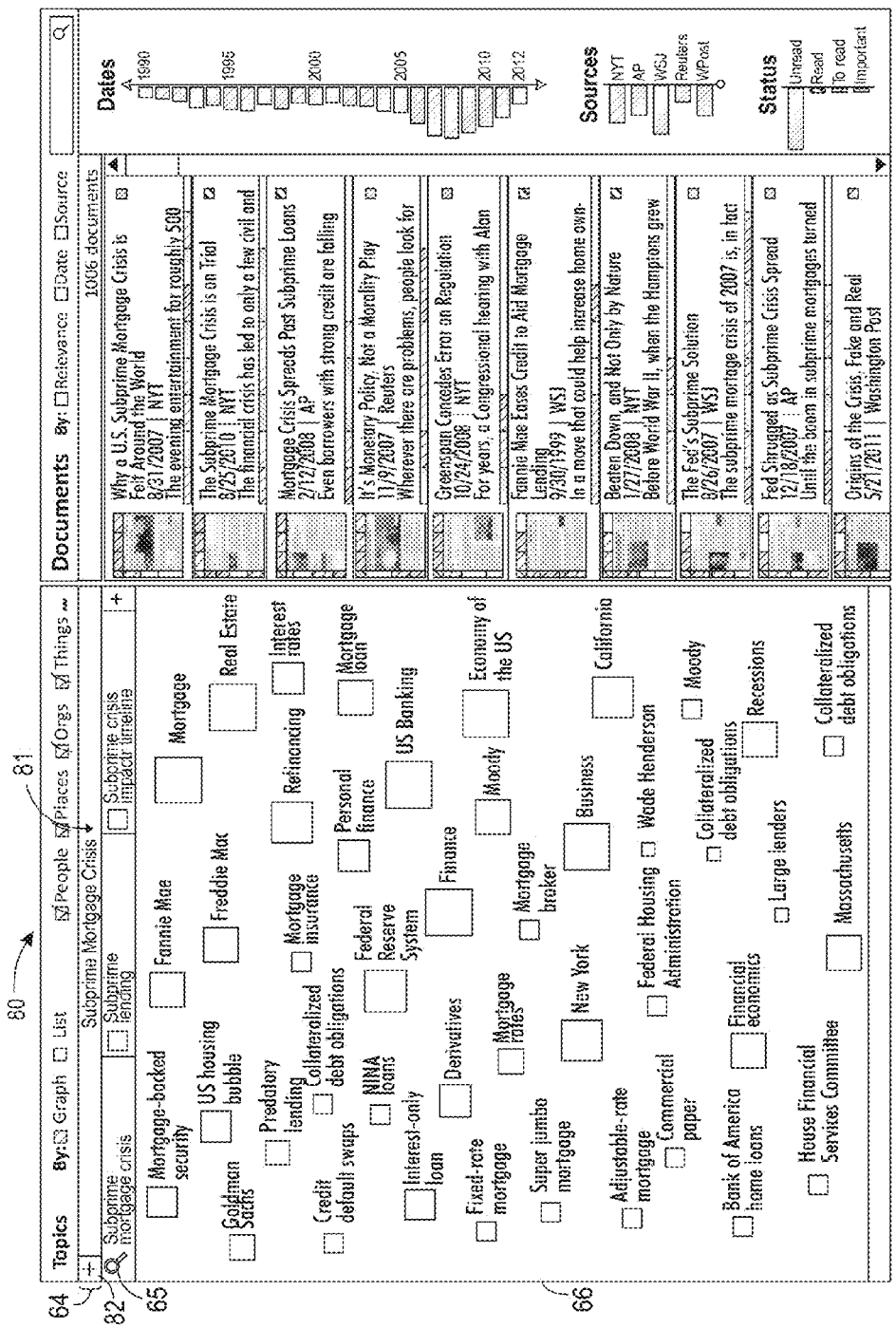
FIG. 6 is a screenshot showing, by way of example, a visual interface for displaying a concept.

Upon entry of two or more topics, the user can label the topics as a concept. FIG. 6 is a screenshot showing, by way of example, a visuospatial search interface 80 for displaying a concept. The user can generate a concept by entering two or more search topics into the search field and by labeling the concept with an identifier. To generate a concept, the user can access a concept menu 81, which can be located near a top of the topic search view in the topic concept identifier field 64. As described above, the identifier can be a term or phrase that covers the topics for that concept. Once generated, the concept is saved and made available in the menu 81. The menu 81 can also include a list of previously defined and saved concepts, as well as the ability to rename a concept. The user can select previously saved concepts to change the search query, resulting in a new set of topics being displayed in the search field 65 and different result topics in the topics graph 66. To add a concept to the search filed 65, the user can select a concept expand button 82 for adding more than one concept to the search field 65.

In one example, a user generates a concept by entering the topics "subprime mortgage crisis," "subprime lending," "subprime crisis impact timeline," into the query field 65, either manually or by dragging a topic box associated with each topic into the field 65. If the number of topics exceeds the display space of the search field, an additional row of search terms can be added below a first row of terms. Alternatively, search slots may adjust in size to receive additional search terms or the row of search slots may scroll. Other mechanisms for adding additional search terms are possible. Subsequently, the user opens the concept menu 81 to label the new concept by assigning the phrase "subprime mortgage crisis," which is then listed in the concept identifier field 64. The topics and concept identifier are compiled and stored as a concept, which can be accessed via the menu 81.

The search can be based on one or more concepts. To conduct the search, the user can enter one or more concepts into the search field 65 using the menu 81, which then populates the search field with the search topics of the entered concepts. The search topics of the concepts can be entered into the search field manually by the user or upon selecting one or more previously defined concepts from the concept menu. If two or more concepts are to be searched, each concept can be listed in a separate row of the search field 65.

An inclusive search or an open search can be conducted using the search topics of the concepts. The inclusive search can be based on a Boolean search that includes the operator "and" between each search term, while the open search can include the Boolean operator "or" between each search term. If two or more concepts are used, the search can be conducted such that topics for a concept within the same row are combined by a Boolean "or" operator, and concepts in different rows are combined with an "and" operator. However, other means for conducting concept searches are possible, such as combining all the topics of the concepts with an "or" or "and" operator. Further, a combination of operators can be used based on a selection of the operators by the user or based on an automatic selection. In another embodiment, the visual search system can combine the topics using other algorithms that take into account the similarity of the topics to determine whether to display the union or intersection of documents, or some subset of the overlapping documents. Additionally, results can be determined via an algorithm that considers the topics, keywords, topic frequencies and global topic relationships. A display of the results can be adjusted based on the user's interaction with the topics and documents.

The query is applied and result topics are identified for display within the topic graph 66. The search results are displayed so that the topics most relevant to the search concepts are located near a top of the topic graph 66, while less relevant topics are located closer towards the bottom of the topic graph 66, as described above with reference to FIG. 5.

Comparing Concepts

Figure 7:
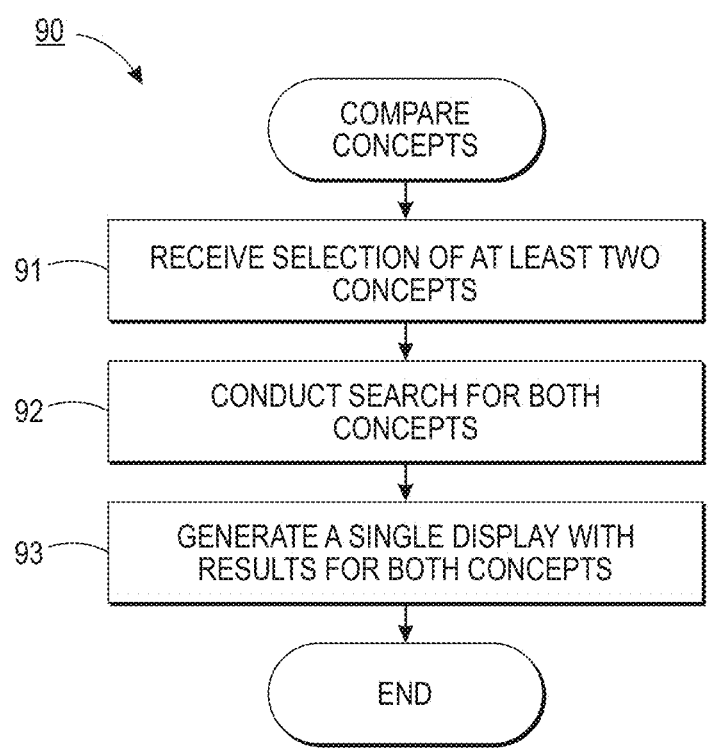
FIG. 7 is a flow diagram showing, by way of example, a method for comparing concepts.

Two or more concepts can be compared to identify the result topics that are relevant to both concepts. A user can compare the concepts by initiating a two-dimensional search for each concept and analyzing the displayed results with respect to the concepts. FIG. 7 is a flow diagram showing, by way of example, a method 90 for comparing concepts. A user selects (block 91) at least two concepts to compare. A first concept can be entered in a search field 65 across a top of the topic search view, while a second concept can be entered in a further search field that is displayed vertically, along a left side of the topic search view. Other locations for the search fields are possible.

A search is conducted for each concept (block 92). Specifically, the search topics for each concept are applied to identify similar topics for returning as result topics. Subsequently, the result topics are combined (block 93) in a single display, such as the topic graph 66, to identify those topics that are most relevant to both concepts.

Figure 8:
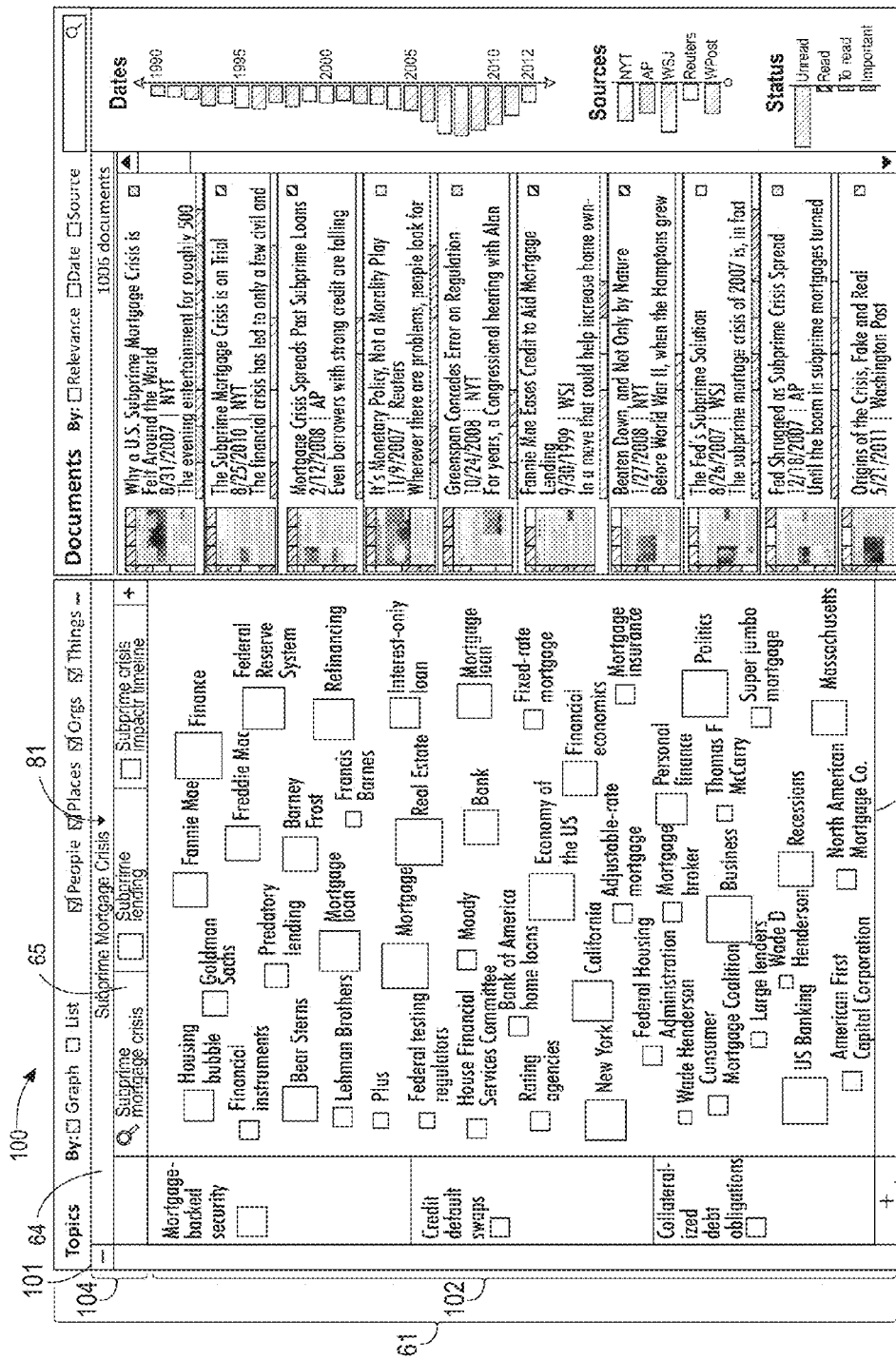
FIG. 8 is screenshot showing, by way of example, a visual interface for displaying results of a concept comparison according to the method of FIG. 7.

A visual display of the results assists a user in easily determining topics shared or relevant to both concepts, as well as topics less relevant to the concepts. FIG. 8 is screenshot showing, by way of example, a visuospatial search interface 100 for displaying results of a concept comparison according to the method of FIG. 7. A first concept entry field 104 can include the concept identifier field 64 and search field 65, and can be located horizontally across a top of the topic search view 61. Also, a second concept entry field 102 can be located vertically along a left side of the topic search view 61. In one embodiment, only the first concept entry field may be displayed initially and the user can open a second search field by selecting an expand button 101 located in the concept identifier field 64. The user can select the expand button 101 with a pointer device, as described above with reference to FIG. 2.

Additionally, a user can open a third concept entry field (not shown) by selecting a different expand button 103, located near a bottom of the topic graph 66. The third concept entry field can expand horizontally along a bottom of the topic search view 61 or along a third dimension that appears in depth to create a 3-dimensional space. A fourth concept entry field (not shown) can also be displayed vertically along a right side of the topic graph. When all four concepts entry fields are filled, the most relevant results can be displayed in a center of the topic graph 66, while the results having less relevance to all the concepts are displayed near one or more concepts with which the concept is most related. As well, the results can be displayed via a three-dimensional display. In one embodiment, a single concept can be entered in each concept entry field; however, in other embodiments, multiple concepts can be entered in each concept entry field.

The user can enter the concepts into the concept identifier field 64 of the concept entry field by dragging topics into the search strip or by selecting one or more predetermined concepts from a concept menu 101. The user can open the concept menu 101 via the pointer device to select the desired concept. Once entered into the concept entry field 104, 102, the search topics associated with the entered concept populate the search field 65 as search topics. Subsequently, a search is conducted for each of the concepts and the combined results are displayed in the topic graph 66. The result topics are relevant to each concept entered in the search fields; however, some topics are more relevant to one of the concepts, while other topics are equally relevant to all the concepts. For instance, when the first and second concept entry fields are populated, the result topics in the graph 66 most relevant to both concepts are located in a top left portion of the graph 66. The document more relevant to the top concept and less relevant to the left concept appear in the top-right portion of the graph, the documents more relevant to the left concept and less relevant to the top concept appear in the lower left portion of the graph, and the documents less relevant to both, but still relevant enough to be displayed in the topics graph, are located toward a bottom right portion of the graph 66.

Figure 9:
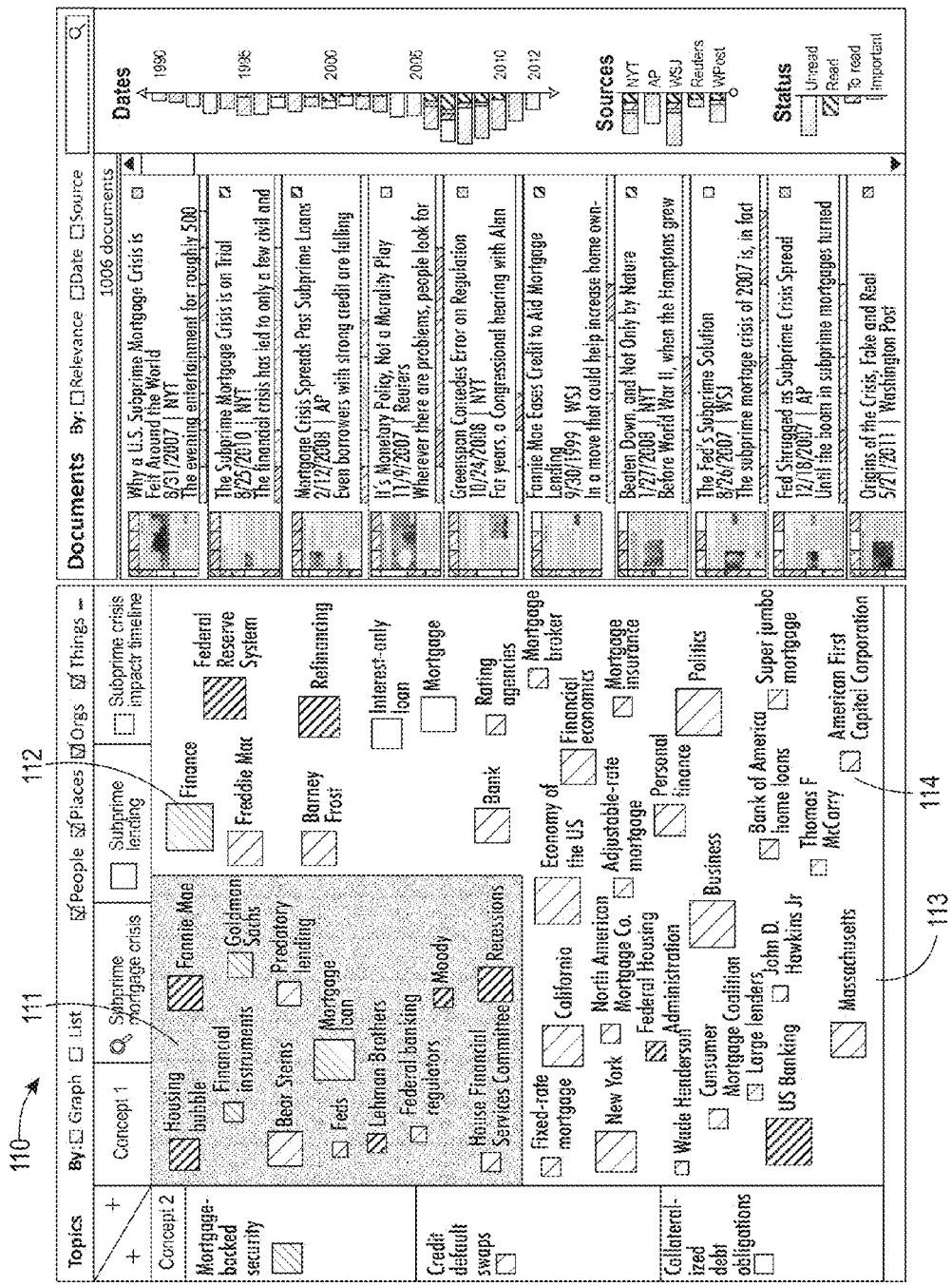
FIG. 9 is a screenshot showing, by way of example, a visual interface for alternatively displaying results of a concept comparison.

In a further embodiment, the results of the concept comparison can be displayed based on designated quadrants of the graph. FIG. 9 is a screenshot showing, by way of example, a visuospatial search interface 110 for alternatively displaying results of a concept comparison. The user populates two or more concept entry fields with concepts and subsequently, the topic graph is divided into quadrants based on a number of populated concept entry fields. With respect to the interface 110 of FIG. 9, a first concept entry field is located horizontally along a top of the topic search view 61 and a second concept entry field is located along a left side of the topic search view 61. A first quadrant 111 is designated in a top left portion of the graph, while a second quadrant 112 is located in a top right portion, a third quadrant 113 is located in a bottom left portion, and a fourth quadrant 114 is located in a bottom right portion. Topics in the first quadrant are highly relevant to both concepts, while topics in the second quadrant are more relevant to the first concept than the second concept and topics in the third quadrant are more relevant to the second concept than the first concept. Meanwhile, topics in the fourth concept are related to both concepts, but are less relevant than those topics in the first quadrant. Other displays of topic relevance are possible.

Topic Filtering

Figure 10:
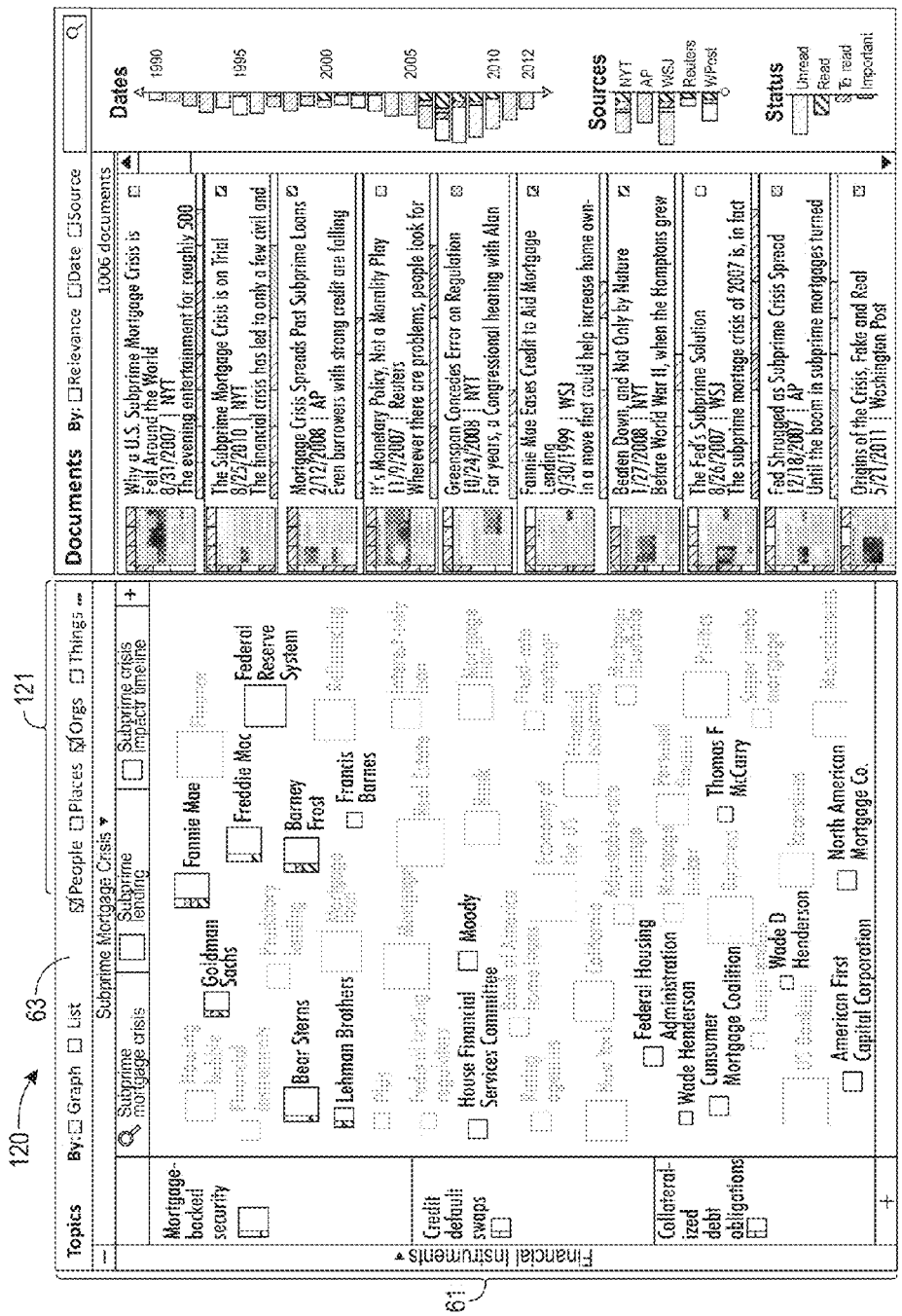
FIG. 10 is a screenshot showing, by way of example, a visual interface for filtering result topics.

Once displayed, a user can filter the result topics. FIG. 10 is a screenshot showing, by way of example, a visuospatial search interface 120 for filtering result topics. The topic filters 121 can be located within the topic search view 61 and can include people, place, organization, or thing, as well as other types of entities. Each topic is associated with an entity type and only those result topics that belong to that type are displayed. For instance, if the user selects only organization topics, then topics such as "Fannie Mae" and "Freddie Mac" are highlighted to distinguish from other topics that are not organizations, including "economy of the U.S." and "economics." The result topics that satisfy the selected filters can be highlighted, color coded, bolded, or emphasized in some other way to distinguish from those result topics that do not satisfy the selected filters, while the result topics that do not satisfy the selected filters can be removed from the topic display, can fade in color or size, or be de-emphasized in some way. If the topics that are not organizations are removed, the topics graph may adjust to include more organization topics that otherwise did not reach the relevance threshold required to be included in the graph. Other filter parameters are possible.

Document Result View

Figure 11:
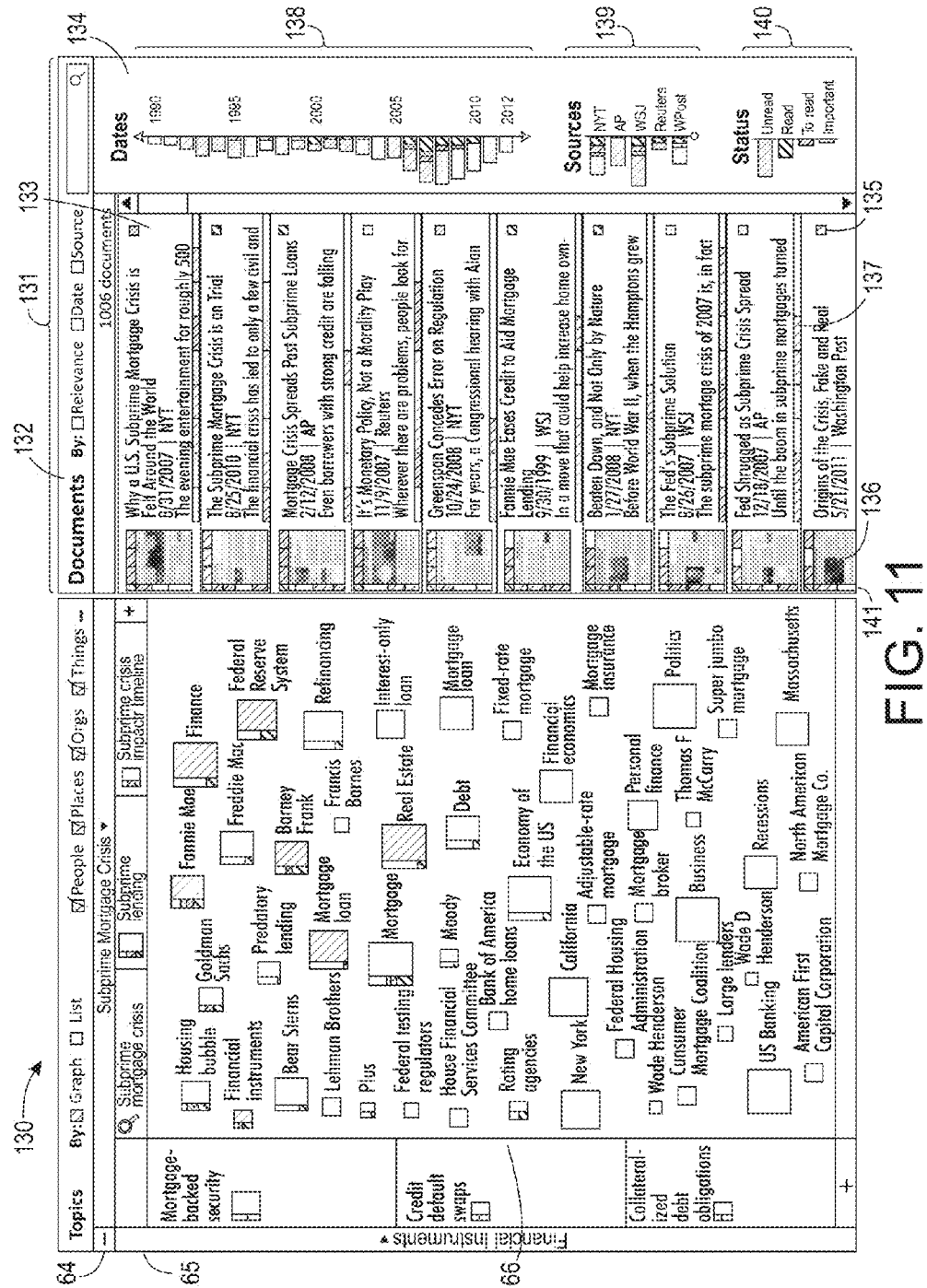
FIG. 11 is a screenshot showing, by way of example, a visual interface with a document section.

The user interface can also include a document section for displaying one or more documents associated with the result topics in the topic display, as well as attributes of the documents. FIG. 11 is a screenshot showing, by way of example, a visuospatial search interface 130 with a document section 131. The documents section can include a document sort field 132, a list of documents 133 related to the search query, and attribute graphs 134. The document section provides the user with a summary view of the documents associated with the result topics, which the user can use to filter the documents and track her progress through review of the documents.

Document List

The documents presented in the list 133 can be determined based on the search query or based on a selected topic within the topic graph 66, or based on a selected attribute within the attribute graphs 134. A user can select to order the documents by relevance, date, or source, as well as by other document attributes, by selecting the appropriate box in the document order field 132. Each document displayed can be identified by a title of the document, a date the document was published, a source of the document, a brief summary, a status 135 of the document, a thumbnail 136 of the document, and a relevance bar 137.

Document Thumbnail

The thumbnail 136 can be an image of the document, such as the first page or a more abstract representation of the contents of the document, and can include one or more topic fields representing each of the search topics or concepts in the query. In one embodiment, the top of the document thumbnail shows an ordered list of topic fields 141 in the search query with the color indicating the presence or absence of that topic in the document. For instance, a first search term, which is located furthest left in the search field 65, can be represented by a topic field 141 located along a top of the thumbnail on the left side. Meanwhile, a second search topic located to the right of the first search term in the search field 65 can be represented by a second topic field 141 to the right of the first topic field in the thumbnail, and so on. Additionally, search topics associated with a second search field vertically along a left side of the topic search view can also be represented in the thumbnail vertically along a left side of the thumbnail representation.

The topic fields 141 can be color coded to indicate a relevance of the entire document to each particular search topic of the query. For instance, a document that is more related to the first search term of a first search field can be displayed by assigning a dark color to the first topic field and a lighter color to the second topic field. Other means for indicating relevance are possible, such as highlighting the topic fields or including text in the topic fields.

Document Relevance Bars

Additionally, each document in the list 133 can be associated with a relevance bar 137 that represents a length of the entire document and identifies areas of the document most related to the search query. In a further embodiment, the relevance bar identifies areas of the document that are most related to one or more result topics selected by the user. A length of the relevance bar 137 reflects the length of the document, such that longer documents are associated with longer relevance bars. The document relevance can be indicated along the relevance bar using different colors. For instance, highly relevant portions of the document can be indicated via a dark color along the reference bar, while portions that are of low relevance can be displayed with lighter colors. Other visualizations of relevance are possible. The user can utilize the document relevance bars to determine which documents have the most sections that are relevance to the search topics of the query and to identify their location in the document.

Document Triage

A user can perform document triage by assigning a status 135, by marking the documents with a status, such as "to read," "important," "read," or "unread." Other statuses are possible, such as "irrelevant," "save," or "send to." For instance, the user can click on a check box to the right side of the document header to toggle between different statuses, including "unread," "to read," "read," and "important." The search system can also assign certain status states automatically, such as marking a document "read" when a user selects that document with a pointer device or "unread" when the user assigns no status to that document. Statuses might also include sub-categories, such as priority levels on documents "to read," or reasons why a document is marked "important." Additionally, a combination of user assignments and default assignments can be used to identify particular documents as unread or read. Each status can be represented by a different color or other marking, such as text, a patterns, or symbols.

The user can remove one or more topics from the topics graph to indicate that the topic is not a result relevant to the search query. Subsequently, the search query can be refined, such that other topics closely related to the removed topic are considered less relevant, resulting in an adjustment of the layout of the remaining topic boxes. Further searches can also be adjusted based on the removal of the topic so as to prevent the result from appearing as a result when the same or similar queries are executed. Document triage allows the user to easily identify which documents she has reviewed, not yet reviewed, or plans to review.

Document Attribute Graphs

The document attributes graphs 134 can be located adjacent to the document list to provide an overview of the documents associated with the topic search results, and can include a date histogram 138, source histogram 139, and status histogram 140. Other attributes are possible. As well, other types of graphs can be used to represent the document attributes, such as a pie chart, a line graph, a map, or a word cloud. The date range histogram 138 is a zoomable visualization that can represent a hierarchy of time ranges, including minutes, hours, days, weeks, months, years, or longer. Other time ranges are possible. The time ranges can be set by pulling or contracting the ends of the histogram line or through some other means. Each time period within the range is represented by a bar, and a length of the bar identifies a number of documents associated with the result topics in the topic graph 66 that were published or released during that particular time. A longer bar indicates more documents published during a particular time, while a shorter bar indicates less documents published. In another embodiment, the date bars represent the dates of the events mentioned in the document.

The source histogram 139 includes one or more sources of the documents associated with the result topics in the topic graph 66. The source can be an entity that publishes the document, such as a news organization, an academic institution, a private company, a department within an organization, or the author of the document. Alternatively, the source could be a medium in which the document was originally published, such as a book, newspaper, Website, magazine, video, or other medium that includes the published document. Additionally, the source histogram can also be modified to display types of sources rather than individual sources. The types of sources can include news articles, scholarly articles, internal briefs, classified documents, and so on. Other sources are possible. The user can receive a list of possible sources and can select which of those sources to display in the histogram. Each source listed can be associated with a bar that represents a number of documents published by that particular source. Zoom capabilities, such as zoom-in and zoom-out, for the source histogram can show a hierarchy of sources.

Meanwhile, the status histogram 140 can include the user's triage activities indicating the document statuses. The user statuses can include "unread," "read," "to read," and "important." Other statuses are possible. The number of marked documents for each status are calculated and used to determine a length of the bar for that status. The user can utilize the status histogram 140 to determine how she is progressing through the documents. In one embodiment, each status is assigned a different color to distinguish between the different statuses. For instance, a gray color is assigned to an unread status, a blue color to a read status, a green color to a to read status, and a red color to an important status. Other colors are possible.

The topic graph, document list, and attribute graphs are interrelated, such that the documents identified in one of the sections are also presented in the other sections. Thus, once a search is updated, the topic graph, document list, and attribute graphs are updated accordingly to reflect the documents associated with the revised result topics.

Document View

Figure 12:
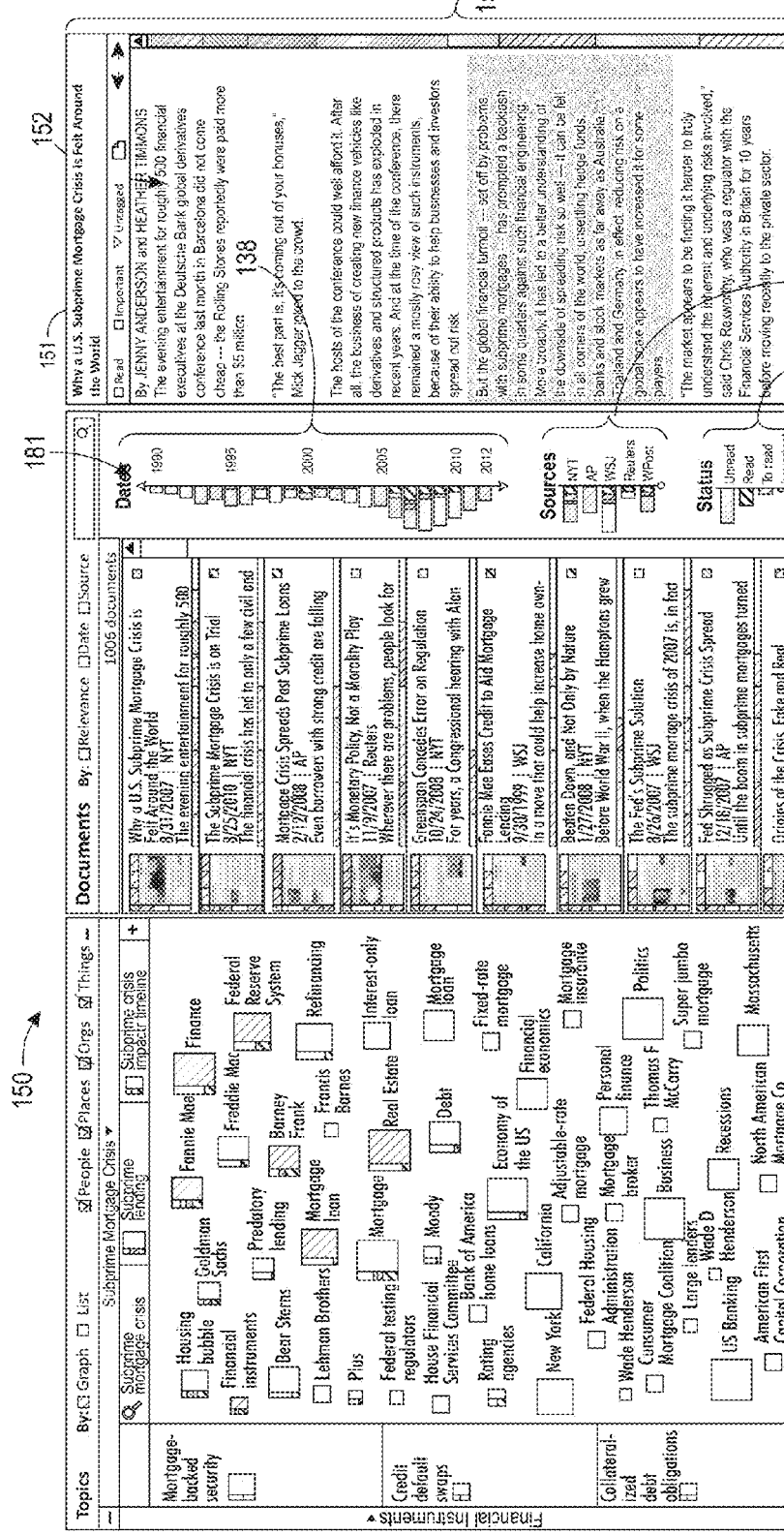
FIG. 12 is a screenshot showing, by way of example, a visual interface with a document view.

The user can analyze the result topics in further detail by selecting a document located in the document list 133 for review. FIG. 12 is a screenshot showing, by way of example, a visual interface 150 with a document view. Upon selection, the text and images of the selected document 152 can be displayed in a document view section 151 of the interface 150. At least a portion of the document 152 can be displayed. However, in one embodiment, the entire document 152 can be provided and the user can scroll through the document via a scrollbar. The scroll bar can include a movable bar 153 and a track 154. Together, the displayed document and scrollbar assist a user in locating portions of the document most relevant to the search topics of the query.

In one embodiment, the scrollbar is located along a right side of the document view section 151. Other locations of the scrollbar are possible. Additional scrollbars can be added, such as at the bottom of the document view section 151. The track 154 can include a relevance bar that indicates the relevance of the document to the search query or the selected topic at particular sections. The relevance can be displayed via different colors, such that sections of the document that correspond with a dark color along the track can be identified as highly relevant to the query or the selected topic, while document sections associated with lighter colors are less relevant. A length of the moving bar 153 can represent the portion of the document displayed in the document view section 151. In one embodiment, the moving bar 153 can be translucent to view the relevance bar over which the moving bar 153 travels. In a further embodiment, the relevance bar is located adjacent to the scrollbar. Other displays of relevance are possible.

The movable bar 153 slides up and down the track 154 to change the portion of the document visible in the document view section 151. Specifically, the user can utilize the scrollbar to immediately identify and locate relevant areas of the document by moving the scrollbar to a dark area on the relevance bar that corresponds with the most relevant sections of the document. The relevance bar for the displayed document can correspond with the relevance bar 137 provided with the same document in the document list 133.

Additionally, portions of the document displayed in the document view section 151 can be highlighted to correspond with the relevance identified by the relevance bar over which the moving bar 153 is located. In one example, the moving bar 153 is located at a top of the track 154, and a first portion of the selected document is provided in the display section 152. The displayed section of the document corresponds with the moving bar 153 so that the first third of the displayed document section is highlighted with a light color to indicate a lower relevance of the subject matter to the search topics of the query, which is also indicated by the relevance bar that shows a first third of the bar as having a light color. Meanwhile, the middle third of the document is highlighted a darker color, which is also displayed on the middle third of the moving bar 153. Finally, the last third of the displayed document is highlighted with a light color, which is reflected in the last third of the moving bar 153. Also, when a user selects a document for display in the document section 151, result topics related to the selected document are identified, such as by highlighting or color-coding the related result topics. In a further embodiment, the topic boxes associated with the related result topics can be filled or unfilled to distinguish from the result topics that are not sufficiently related to the selected document, or the unrelated result topics can fade from the topic graph, such as by reducing a display intensity of the topic box. The relatedness of the topics can be determined using a cosine similarity measure between the documents in each topic and the selected document. Other measures of relatedness are possible.

Selecting Topics

Figure 13:
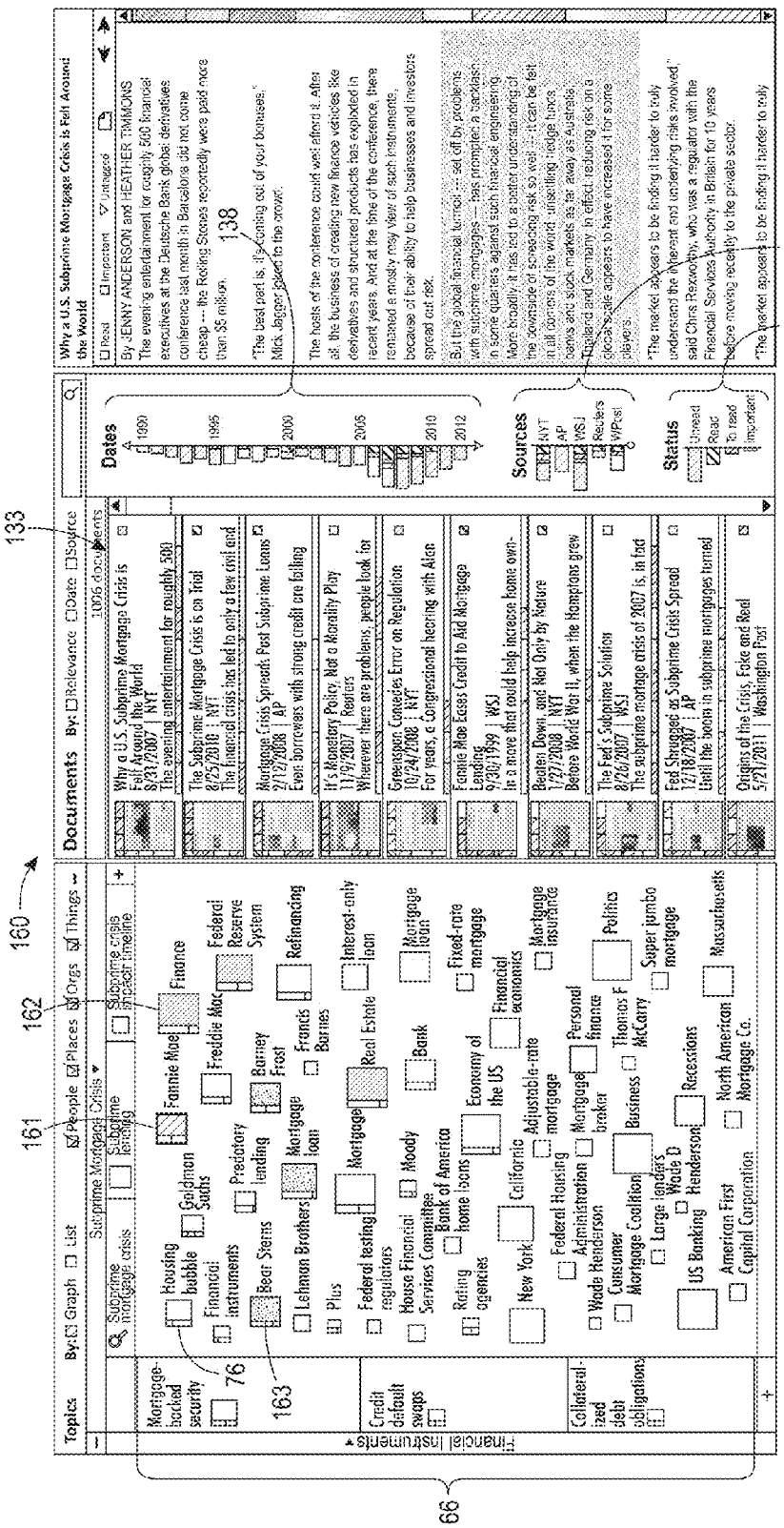
FIG. 13 is a screenshot showing, by way of example, a visual interface for selecting a document or topic.

Once the results are displayed, the user can interact with the interface to review the results in detail, refine the search, or filter the results. FIG. 13 is a screenshot showing, by way of example, a visuospatial search interface 160 for selecting a document or topic. Once a query is entered and results are displayed via topic boxes in the topic graph 66, a user can select one of the result topics 161 to identify related topics and documents. The user can select the result topic 161 via a pointer device, such as a mouse, stylus, finger, or other type of pointer device. Specifically, the user can use the pointer device to hover over the topic box associated with the topic or to click or tap on the topic box.

Once selected, the related topics 162, 163 are highlighted or color-coded based on a relevance of that topic to the selected topic. In one example, a color similar to a color of the selected document can be assigned to those topics 162 having a higher relevance to the selected topic, while a different color is assigned to topics 163 that are less relevant. Other methods for visualizing relatedness are possible, such as varying the darkness of the color to show degree of relevance or using shape, perceived depth, font treatment, or animation, as well as patterns and icons. The relevance, or relatedness, of a topic can be determined by comparing the documents associated with the selected result topic with the documents of each other result topic. The result topics having documents most related to the documents of the selected topic are selected as related topics. In one example, the documents can be compared using cosine similarity. However, other means for determining document relevance can be used.

A measure of relevance can be assigned to each result topic based on the document comparison and a threshold can subsequently be applied. Those result topics with relevance measures that satisfy the threshold can be identified as relevant to the selected result topic and color-coded accordingly to indicate the amount of relevance or relatedness. The threshold can be set automatically, by the user, or as a default.

Upon selection of a result topic, the documents in the list 133 are also updated to reflect only those documents that are associated with the selected result topic. As well, each of the document attribute graphs 138-140 is also updated to reflect the documents associated with the relevant topics.

Visual Indicators and Interaction

To make the results more manageable, a user can interact with the interface to identify particular items of interest, such as concepts, topics, and documents, by filtering the results.

Topic and Document Filtering

Figure 14:
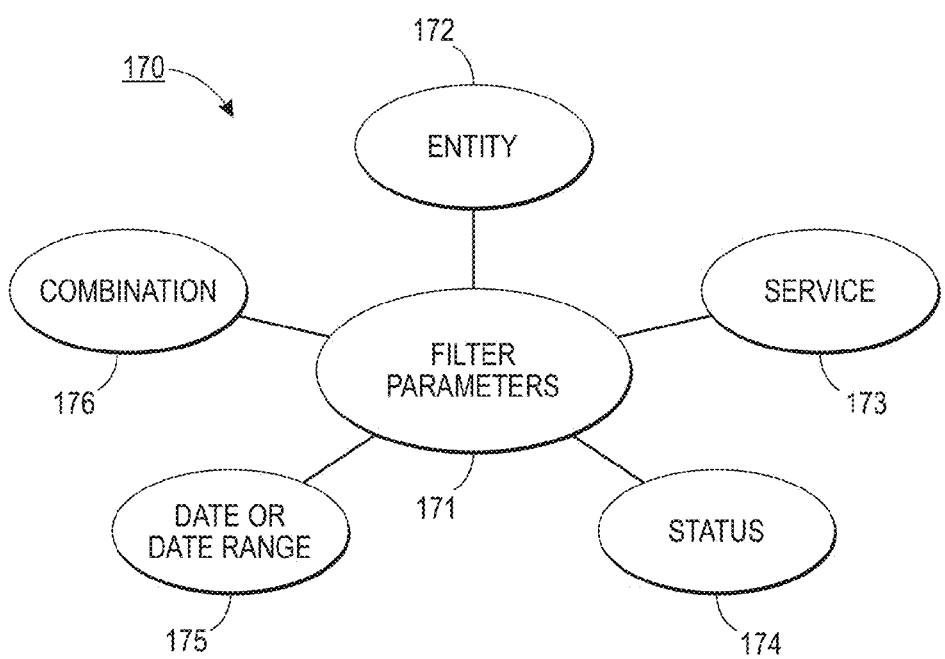
FIG. 14 is a block diagram showing, by way of example, filter parameters for identifying the topic results or documents of interest.

The topics and associated documents can also be filtered using attributes associated with the documents. FIG. 14 is a block diagram 170 showing, by way of example, filter parameters 171 for identifying the topic results or documents of interest. The result topics and documents can be filtered based on topic type 172, document source 173, document status 174, document dates 175, and a combination 176 of the topic type, source, status, and dates parameters. Each of the parameters is described above in detail with reference to FIGS. 3, 5, and 6.

Figure 15:
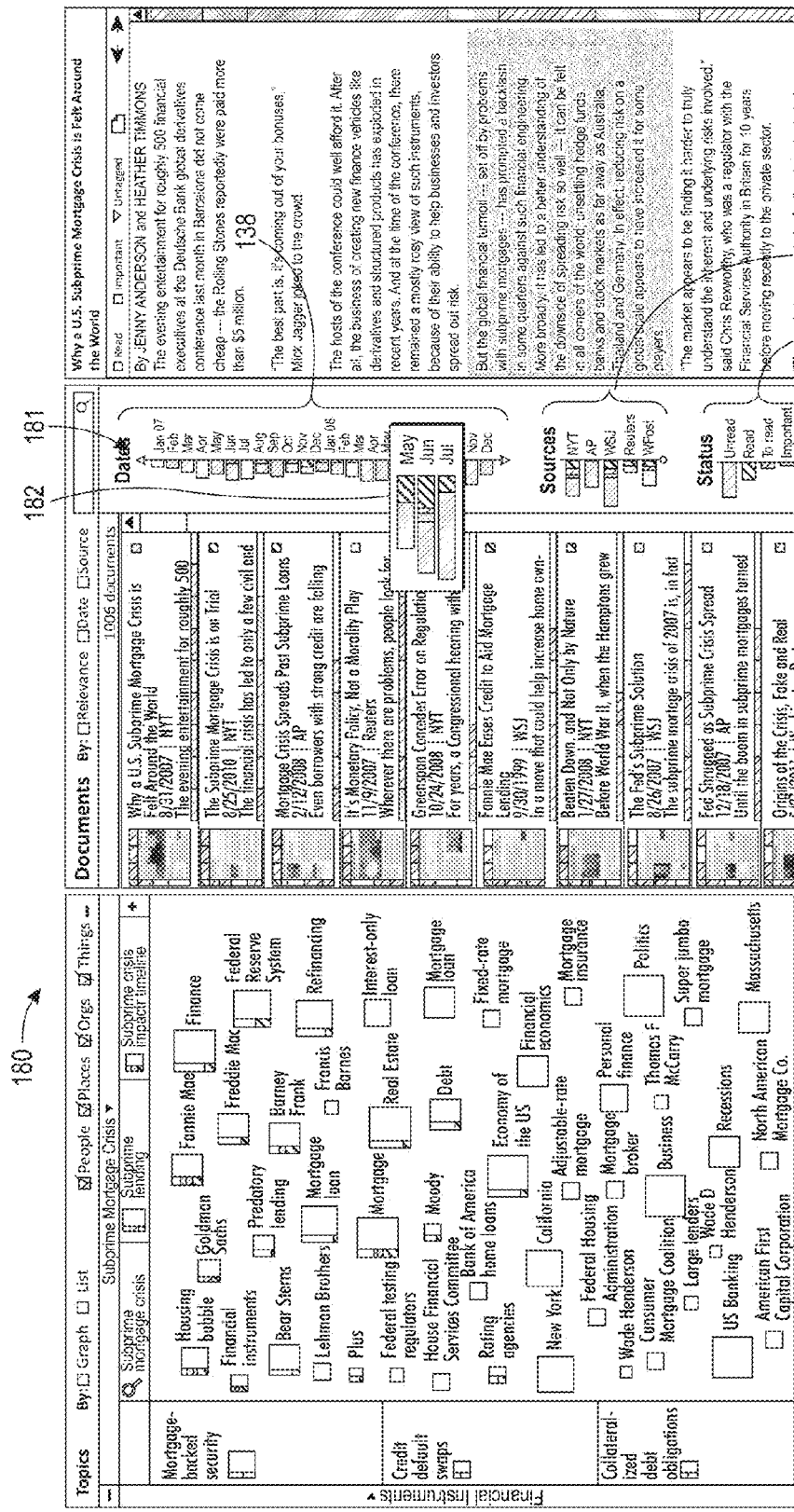
FIG. 15 is a screenshot showing, by way of example, a visual interface for filtering results.

The filters can be applied to the results displayed in the topic graph, the documents in the list, any of the characterization graphs, and the document view. Any changes based on the filters to one of the displays, are applied to the other displays. FIG. 15 is a screenshot showing, by way of example, a visual search interface 180 for filtering results. The results can be filtered based on the parameters described above with reference to FIG. 14, including topic type, source, status, and dates. A date range 181 of all the search results can be adjusted to filter the documents to display only a subset. For example, all the documents for the resulting topics can be organized by publication date along the date histogram 138. Most of the documents occur later in time, from around 2005 to 2012; however, the entire range is from 1990 to 2012. Thus, a user may want to focus more closely on the most recent documents and can change the date range to 2007 to 2008, during which the most documents were published. Those documents published from 1990 to 2006 and 2009-2012 are no longer displayed by the date histogram and the same changes are made to each of the topic graph, document list, and remaining attribute graphs, such that only those documents published between 2007 to 2008 are represented by each display. The non-represented documents can be removed from the display or can fade into the background, such as by reducing an intensity of the color or size. Other date filters can be used, such as months, days, or times. Additionally, since the time range of the date histogram is greatly reduced, each bar can now represent a shorter amount of time, such as a month, whereas the complete date histogram from 1990 to 2012 used the bars to represent years. Other examples are possible.

The results can also be filtered by source. A source histogram 139 organizes documents associated with the result topics by a publication source. The sources can include companies, journals, newspapers, universities, briefs, Web published documents, and books, as well as other sources. The sources can include the New York Times (NYT), Associated Press (AP), Wall Street Journal (WSJ), Reuters, and Washington Post (WPost), as well as other sources. In one example, the user can select a bar to further research only those documents from particular sources, such as the WSJ and WPost. Accordingly, documents published by the NYT, AP, and Reuters can be removed or made less visible to the user by using a lighter color of text. Additionally, the topic graph, document list, date histogram, and a status histogram can be updated to include or highlight only those documents that were published by the WSJ and WPost.

The status filter can be used to identify a portion of the documents marked with a particular status by the user. The user statuses can include "unread," "read," "to read," and "important." The status histogram 140 can be used to organize the documents of the topic results by user status. In one example, the user may wish to review all the documents that she has marked as "to read." The "to read" documents can be selected by selecting the bar associated with the "to read" status of the status histogram 140. The documents with a "to read" status remain displayed, while the documents with other statuses are removed from the display or visually reduced so that the "to read" documents are more easily displayed. Changes to the status histogram 164 are applied to the topic graph, document list, date histogram, and source histogram.

Additionally, the user can apply two or more filters to identify those documents and topics that satisfy both filters. For instance, a user may wish to review all those documents that she has read and that were published in 2008. To apply the filters, the user can identify the bar associated with the year 2008 and select the color purple, which is associated with the "read" status, using a pointer device. Accordingly, based on the filters, the result topics in the topic graph are updated to display only those topics that include documents published in 2008 and that were read by the user. As well, the document list and status histogram can also be updated to display only those documents published in 2008 that were read by the user. If the desired information represents a small portion of the total information represented by a bar in one of the histograms, the bar can be expanded when the user hovers a pointer device over a section of the bar to target a subset of the bar.

During the user's review of the documents, she may identify a topic or document that is not of interest. The user can elect to remove that topic or document by selecting a menu option (not shown) for deleting or hiding the topic or document, or by dragging the particular item off the topic graph or document list. Upon removal of the topic or document, the visual search system learns which topics or documents are not relevant to the particular search query and adjusts the relevance of those topics and documents to prevent the topic or document from appearing as a result in other related searches. Additionally, when the user marks particular topics or items as important or of interest as described above, the system can use the information for adjusting the relevance of those topics and items with respect to the search query.

Additionally, at any point during the user's review of the entities, she can place a pointer device over any portion of the histograms to reflect a sub-region 182 of the graph in higher resolution to be able to see the small status markings easily. Additionally, a display of a graph sub-region can be used by the user to select a portion of one of the histogram bars associated with a variable. For example, the user can open a pop up window 182 by hovering his pointer device over the date histogram to display in further detail the months of May, June, and July 2008. The pop up window displays the month variables 182 in greater detail so that a user can filter the entities by selecting a user status displayed on one of the bars, such as those documents published during June 2008 that the user has read. The read documents of June 2008 can be indicated by a color or a symbol, including dark stripes over a representation of the read entities for the June variable.

Coverage Tracking

Figure 16:
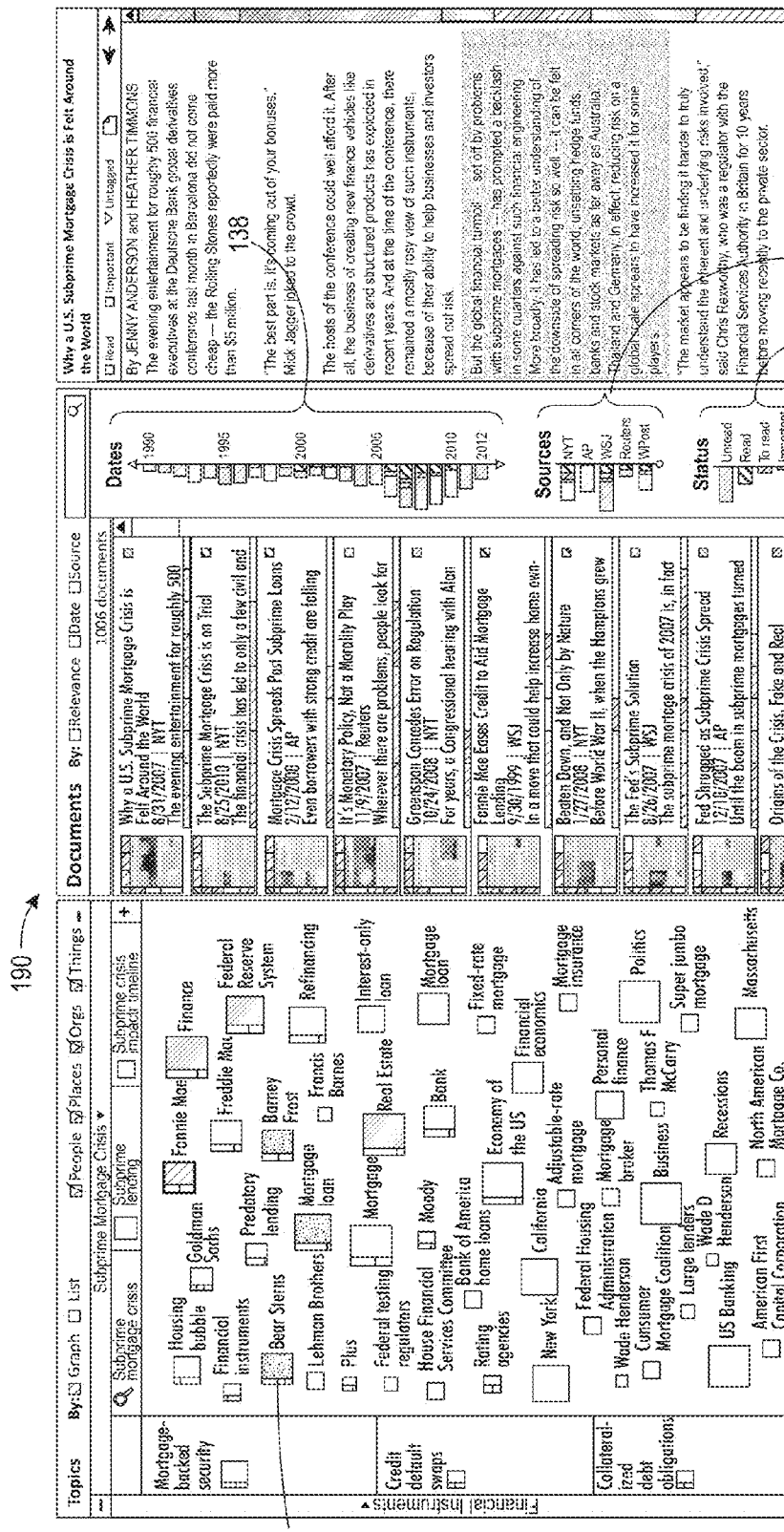
FIG. 16 is a screenshot showing, by way of example, a visual interface for tracking user coverage.

A user can easily track her research using document statuses assigned to one or more document attributes. FIG. 16 is a screenshot showing, by way of example, a visual search interface 190 for tracking user coverage. Each of the result topics can be associated with a status bar 191 indicate the user's status with respect to documents associated with that topic. The status bar can represent all of the documents associated with a topic and can be color-coded to identify an amount of documents associated with each status, such as "read," "to read," "unread," and "important." In one embodiment, the status bar 191 is located along a left side of the topic box for that result. However, other locations are possible, such as along a top, bottom, or right side or inside the box. The status bar 191 can provide valuable information to the user, including how many documents a user has read with respect to a number of documents associated with a particular topic and how many a user plans on reading. Specifically, a user can determine how much material she has covered with respect to a particular topic.

The user can also track her status using the status histogram. To identify those documents marked with a particular status, the user can select the status using the pointer device. The documents assigned the selected status are then displayed in the document list and the topics associated with the displayed documents in the list are also displayed. Further, the date and source histograms are updated to reflect only those documents that the user has read.

Further, a user can see how many documents are associated with a particular status by date or source. For instance, a user status of the documents can also be reflected on the date histogram and source histogram to indicate how much material the user has covered by source and time. With regards to the date histogram, the user statuses can be displayed by applying an appropriate status color to the bars of the histogram. For example, in the date histogram, 2008 is associated with a longest bar indicating the year during which the most documents were published. If 400 documents were published in 2008 and the user has read 20 of the documents, then a length of the bar is colored purple to indicate the amount of documents read by the user that were published in 2008. Specifically, the portion of the bar that is colored blue is proportionate to the number of documents read. Thus, 5%, or ¹⁄₂₀, of the bar for 2008 would be colored purple. Also, in this example, the user has marked 50 documents with a "to read" status, which is 12.5% of the total documents for 2008. Thus, 12.5% of the bar is shaded, or colored, green to indicate a portion of the documents published in 2008 that the user intends to read. The color green can be applied adjacent to the color red for read documents.

The order in which the user statuses are displayed along each bar can be selected by the user, implemented as a default, or can be arbitrary. Other colors or markings to indicate user status are possible. The user statuses can be similarly applied to the source histogram 139 to indicate a user's progress of reviewing documents organized by source. Color coding the source histogram with user status can assist a user in identifying how much material she has covered with respect to documents published by a certain source.

As a user assigns a status to one of the documents in the list, the status is also reflected in the status histogram and the status bar of the topic results. Tracking the user's status allows that user to see how many of the documents associated with the result topics she has covered, either by reading the full document, a portion of the document or a summary of the document. The user can then use the tracked information to determine how much more of the material she needs to review to get a good understanding of the information surrounding the topics of the search query. The user can also track her status with respect to other attributes, including source.

Exploring and filtering the information space based on attributes can be used for information types other than documents, such as stored data, financial records, movies, insurance claims, cars, patents, photographs, and social networking updates, such as statuses or tweets, as described further in commonly-owned U.S. Patent Application entitled "Computer-Implemented System and Method for Exploring and Filtering an Information Space Based on Attributes Via an Interactive Display, by Isaacs, filed on Apr. 19, 2013, pending, the disclosure which is hereby incorporated by reference.

Structured Columns

Figure 17:
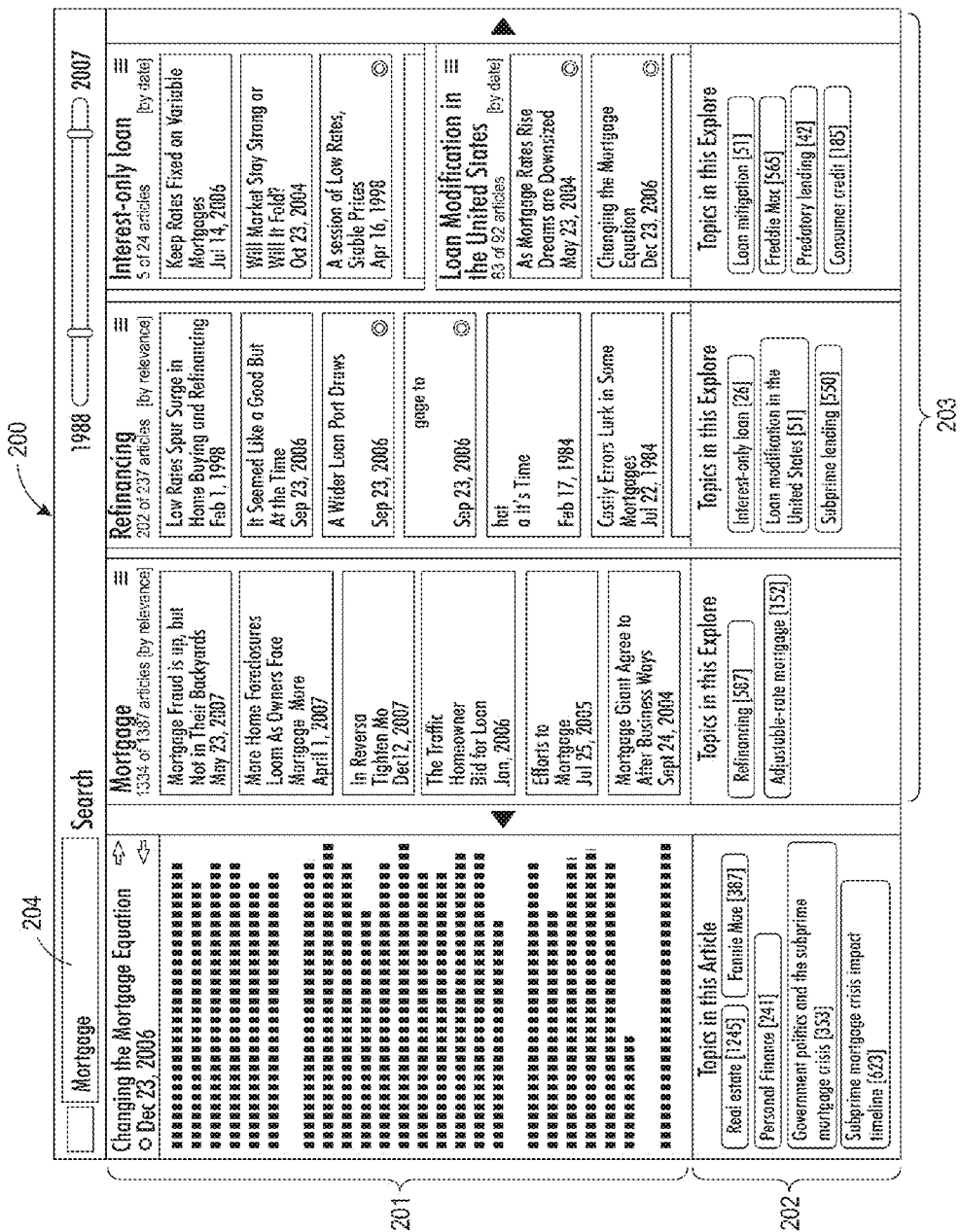
FIG. 17 is a screenshot showing, by way of example, a visual interface for an ordered review of topics.

During review of the results, whether presented as a graph or list, the user can explore the topics and track her exploration through the topics using structured columns. FIG. 17 is a screenshot showing, by way of example, a search interface 200 for an ordered review of topics. The interface 200 includes a document view 201 for presenting a document and a topic cloud 202 that includes topics identified within the displayed document. The document displayed can be associated with a topic selected by the user. For instance, the user can enter a topic of interest into a search field 204. The topic cloud 202 can be located adjacent to the displayed document, such as below the displayed document 201, however, other locations are possible.

Topic columns 203 can be located adjacent to the document view 201. The topic columns 203 can represent a sequence of search topics entered by the user. The first topic column, which can be located to the left of the other columns, can include a list of documents associated with the first search topic. Another cloud of topics associated with the displayed documents can be located below the first topic column. A user can select one or more of the topics from the displayed document and drag or otherwise place them below the topic column associated with that search query. A cloud of topics associated with the documents in the second topic search column can be displayed. A user may select one or more of the topics for exploring in a third column, and so on. The columns allow a user to track her exploration of the topics and associated documents so that she can identify any missed material that should have been reviewed. Additionally, the user can select further topics to explore by selecting a topic in one of the topics clouds.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for visual search construction, comprising:
   receiving via a computing device instructions from a user to retrieve topic results, the instructions comprising at least two search queries, each query comprising one or more search topics from the user;
   positioning via a server one of the search queries along one side of a graph and positioning at least one of the other search queries along a different side of the graph, wherein the server comprises a central processing unit, memory, an input port to receive the instructions, and an output port;
   conducting a search via the server for each of the queries and identifying resulting topics for each of the search queries;
   combining the topic results for the queries into a display space;
   displaying each of the topic results as a topic box, wherein a size of the topic box represents a number of documents associated with the topic result of that topic box;
   providing a coverage bar on one side of one or more topic boxes that displays activity of the user regarding reviewing the documents associated with the topic result for that topic box by displaying categories of status tags for the documents and an amount of documents with status tags for each category;
   generating and displaying an attribute graph overlayed with the status tags of the coverage bars for user status with respect to the documents associated with the displayed topic results;
   associating a different color with each category for display within the coverage bars and the attribute graph;
   receiving from the user at least one status tag comprising the user's progress with respect to covering one of the documents associated with the topic results;
   updating the attribute graph with the status tag received from the user for the one or more documents; and
   updating the coverage bar for the topic boxes in the display space that are associated with the one or more documents with the user status tag received from the user.

2. A method according to claim 1, further comprising:
   placing at least one of the queries in a search field horizontally located within the graph;
   placing another of the queries in a search field vertically located within the graph; and
   displaying the topic results with respect to the vertically located and horizontally located queries.

3. A method according to claim 1, further comprising at least one of:
   placing the topic results most relevant to both queries near both queries;
   placing the topic results more relevant to the queries in the horizontal search field closer to the horizontal search field than the vertical search field;
   placing the topic results more relevant to the queries in the vertical search field closer to the vertical search field than the horizontal search field; and
   placing the topic results relevant to both queries an equal distance from both queries.

4. A method according to claim 1, further comprising:
   displaying a list of the documents associated with at least one of the topic results.

5. A method according to claim 4, further comprising:
   associating a relevance bar with one or more of the documents in the list, wherein the relevance bar identifies a relevance of the search topics of the query to each section of that document.

6. A method according to claim 5, further comprising:
   associating each displayed document with a thumbnail icon; and
   indicating within the thumbnail icon those search topics included in the associated document.

7. A method according to claim 5, further comprising:
   receiving a selection of one of the documents in the list; and
   displaying at least a portion of the selected document.

8. A method according to claim 7, further comprising:
   presenting a scroll bar with the selected document, wherein the scroll bar is a relevance bar that identifies a relevance of each section of the document.

9. A method according to claim 7, further comprising:
   highlighting the relevant portions of the selected document that is displayed.

10. A method according to claim 6, further comprising:
    arranging topic fields within the thumbnail icons that correspond with the positioned search topics of each query.

11. A method according to claim 10, further comprising:
    color coding the topic fields based on a relevance of the positioned search topics to the document associated with the thumbnail icon.

12. A method according to claim 1, further comprising:
    displaying one or more graphs of documents associated with the topic results based on attributes comprising at least one of topic type, source and date parameters.

13. A method according to claim 12, further comprising:
    receiving from a user, a selection of at least a portion of one of the graphs;
    filtering the documents and corresponding topic results based on the selected portion of the graph; and
    displaying the filtered documents and topic results.

14. A method according to claim 1, further comprising:
    updating the attribute graph, comprising:
      compiling all the documents with a common status from the document statuses; and
      tracking a progress of the user based on the compiled documents with the common status, comprising:
        determining the received document status; and
        applying the document status to the attribute graph for the compiled documents with the common status.

15. A method according to claim 14, further comprising:
    generating at least one graph from the compiled documents comprising one of a histogram, pie chart, line graph, map, and word cloud.

16. A method according to claim 1, further comprising:
    receiving from the user, a selection of at least one of the topic results; and identifying one or more of the remaining topic results that are relevant to the selected topic result.

17. A method according to claim 1, further comprising: visually filtering the topic results based on at least one of person, place, organization and thing.

18. A computer-implemented system exploring and filtering an information space based on attributes via an interactive display, comprising:
   a computing device to receive from a user instructions to retrieve topic results; and
   a server comprising a central processing unit, memory, an input port to receive the instructions, and an output port, wherein the instructions comprise at least two search queries, each query comprising one or more search topics from the user and the central processing unit is configured to:
      position one of the search queries along one side of a graph;
      position at least one of the other search queries along a different side of the graph;
      conduct a search via the server for each of the queries and identify resulting topics for each of the search queries; and
      combine the topic results for the queries into a display space;
      display each of the topic results as a topic box, wherein a size of the topic box represents a number of documents associated with the topic result of that topic box;
      provide a coverage bar on one side of one or more topic boxes that displays activity of the user regarding reviewing the documents associated with the topic result for that topic box by displaying categories of status tags for the documents and an amount of documents with status tags for each category;
      generate and display an attribute graph overlayed with the status tags of the coverage bars for user status with respect to the documents associated with the displayed topic results;
      associate a different color with each category for display within the coverage bars and the attribute graph;
      receive from the user at least one status tag comprising the user's progress with respect to covering one of the documents associated with the topic results;
      update the attribute graph with the status tag received from the user for the one or more documents; and
      update the coverage bar for the topic boxes associated with the one or more documents with the user status tag received from the user.

* * * * *